US Patent Number: 5,047,278
Date of Patent: Sep. 10, 1991

Ono et al.

[54] POLYESTER FILM AND MAGNETIC RECORDING MEDIUM

[75] Inventors: Masaaki Ono, Mishima; Takao Izasa, Moriyama; Kazuo Okabe, Mishima, all of Japan

[73] Assignee: Toray Industries, Inc., Japan

[21] Appl. No.: 296,053

[86] PCT No: PCT JP 88/00444 § 371 Date: Jan. 6, 1988 § 102(e) Date: Jan. 6, 1988

[87] PCT Pub. No: WO 88/08437 PCT Pub. Date: Nov. 3, 1988

[22] PCT Filed: May 2, 1988

[30] Foreign Application Priority Data

May 1, 1987 [JP] Japan .................. 62-106305

[51] Int. Cl.$^5$ .............................................. G11B 23/00
[52] U.S. Cl. ............................ 428/141; 428/480; 428/694; 428/900
[58] Field of Search ................. 428/480, 694, 900, 141

[56] References Cited

U.S. PATENT DOCUMENTS

| | | | |
|---|---|---|---|
| 4,670,319 | 6/1987 | Katoh et al. | 428/480 |
| 4,687,699 | 8/1987 | Hensel et al. | 428/480 |
| 4,687,700 | 8/1987 | Hensel et al. | 428/480 |
| 4,710,421 | 12/1987 | Ono et al. | 428/480 |
| 4,732,814 | 3/1988 | Hatada et al. | 428/480 |
| 4,743,487 | 5/1988 | Saito et al. | 428/900 |
| 4,767,657 | 8/1988 | Sakamoto et al. | 428/480 |
| 4,798,759 | 1/1989 | Dallman et al. | 428/480 |
| 4,804,736 | 2/1989 | Utsumi | 422/480 |
| 4,861,674 | 8/1989 | Inaba et al. | 428/480 |

*Primary Examiner*—Paul J. Thibodeau
*Attorney, Agent, or Firm*—Austin R. Miller

[57] ABSTRACT

A polyester which is prepared by using a germanium compound as the polymerization catalyst, in which the Young's modulus $E_{MD}$ in the machine direction and the Young's modulus $E_{TD}$ in the transverse direction satisfy the requirements of $E_{MD} \geq 350$ kg/mm$^2$, $E_{TD} \geq 350$ km/mm$^2$ and $E_{MD} \times E_{TD} \geq 250,000$ kg$^2$/mm$^4$, the refractive index $n_{ZD}$ in the thickness direction satisfies the requirement of $1.480 \geq n_{ZD} \geq 1.492$, and the maximum roughness Rt of at least one surface satisfies the requirement of Rt $\geq 100$ nm, is valuable as a base film for a magnetic recording medium. A laminate structure of a polyester layer A and a polyester layer B is also used as a base film for a magnetic recording medium, in which the above requirements of $E_{MD}$, $E_{tD}$ and $n_{ZD}$ are satisfied, fine particles are incorporated in the layer B, the outer surface of the layer A satisfies the requirement of Rt $\geq 100$ nm and Rt of the outer surface of the layer B is in the range of from 30 to 150 nm. A magnetic recording medium having a ferromagnetic metal thin film formed thereon, which is prepared by using this polyester film has a good processability at the preparation and shows a reduced drop-out, and this magnetic recording medium is scratched only to a negligible extent by contact with a magnetic head and does not damage the magnetic head.

19 Claims, No Drawings

POLYESTER FILM AND MAGNETIC RECORDING MEDIUM

DESCRIPTION

Polyester Film and Magnetic Recording Medium

1. Technical Field

The present invention relates to a polyester film. More particularly, it relates to polyester film exhibiting a good slipperiness. This polyester film is suitable as a base film of a magnetic recording medium comprising a ferromagnetic thin film as the recording layer, such as a magnetic tape.

2. Background Art

As the magnetic recording medium, especially the base film for a ferromagnetic thin film, there are known the following films.

(1) A composite film comprising a laminate comprised of a smooth thermoplastic film and a fine particulate-containing thermoplastic film, and a covering layer mainly comprised of a lubricant, which is formed on the outer surface of the fine particle-containing film layer (see, for example, Japanese Unexamined Patent Publication No. 58-153639).

(2) A polyester film having one surface rendered easily slippery by forming a coating in which a lubricant is dispersed, while the other surface is smooth (see, for example, Japanese Unexamined Patent Publication No. 57-162123).

(3) A composite polyester film comprising a laminate of two polyethylene terephthalate films having different intrinsic viscosities, and a ferromagnetic metal thin film formed on the surface of the layer having a lower intrinsic viscosity (see, for example Japanese Unexamined Patent Publication No. 57-200932).

(4) A smooth, biaxially oriented polyester film having fine protrusions formed thereon, in which the surface roughness, the Young's modulus in the longitudinal direction and the thermal shrinkage in the lateral direction are specified and a lubricant-containing coating is formed on one surface (see, for example, Japanese Unexamined Patent Publication No. 62-32048).

(5) A smooth polyester film having granular protrusions formed on one surface (see, for example, Japanese Unexamined Patent Publication No. 54-94574).

(6) A smooth polyester film having worm-like modules formed on both surfaces thereof (see, for example, Japanese Unexamined Patent Publication No. 56-10455).

(7) A polyester film having a discontinuous thin film layer composed mainly of a water-soluble polymer and having a thickness smaller than 50 nm, which is formed on at least one surface (see, for example, Japanese Unexamined Patent Publication No. 58-62826).

(8) A polyester film having a discontinuous thin film layer composed manly of a water-soluble polymer and a silane coupling agent and having a thickness smaller than 50 nm, which is formed on at least one surface (see, for example, Japanese Unexamined Patent Publication No. 58-65658).

(9) A polyester film having a discontinuous thin film layer composed mainly of a polymer blend containing an easily-bonding resin and fine particles having a particle diameter of 5 to 50 nm, and having a thickness smaller than 50 nm, which is formed on at least one surface (see, for example, Japanese Unexamined Patent Publication No. 60-180839).

(10) A polyester film having protrusions having a height of 10 to 200 nm at a density of 10,000 to 1,000,000 protrusions per $mm^2$ on the average (see, for example, Japanese Unexamined Patent Publication No. 58-100221).

(11) A polyester film having protrusions having a height of 5 to 60 nm at a density of $1 \times 10^5$ to $1 \times 10^8$ protrusions per $mm^2$ on the average (see, for example Japanese Unexamined Patent Publication No. 60-93636).

(12) A fine particle-containing polyester film in which surface protrusions are formed by the fine particles, and a discontinuous thin film layer composed mainly of a polar polymer and having a height smaller than the height of the surface protrusions is formed on the surface (see, for example, Japanese Unexamined Patent Publication No. 62-130848).

(13) A composite film comprising a laminate of a smooth thermoplastic film and a fine particle-containing thermoplastic film, in which a discontinuous film layer is formed on the outer surface of the smooth film layer and a coating layer composed mainly of a lubricant is formed on the outer surface of the fine particle-containing film layer (see, for example, Japanese Unexamined Patent Publication No. 58-153640).

As the base film of an ordinary magnetic recording tape, there are known the following films.

(14) A polyester film in which the intrinsic viscosity, the density and the refractive index n in the direction perpendicular to the plane of the film are specified and especially, the requirements of $n \leq 1.491$ is satisfied (see, for example, Japanese Unexamined Patent Publication No. 53-138477).

(15) A biaxially drawn polyester which is drawn and oriented in the lateral direction more highly then in the longitudinal direction, in which a specific relationship is established among the refractive index nz in the thickness direction, the difference Δn between the refractive index in the longitudinal direction and the refractive index in the lateral direction, and the intrinsic viscosity [η] of the polyester film (see, for example, Japanese Unexamined Patent Publication No. 57-162126).

As the transparent polyester film, there are known the following films.

(16) A polyester film having a thickness of 25 to 500 μm, which is formed by polycondensation using a germanium compound as a part of the catalyst (see, for example, Japanese Unexamined Patent Publication No. 60-85925).

(17) A polyester film formed by polymerization using germanium as the main catalyst, which has an inorganic particle-containing coating formed on at least one surface (see, for example, Japanese Unexamined Patent Publication No. 60-89334).

In the above-mentioned films (1), (2), and (5), since a metal thin film layer is formed on the surfaces of a smooth thermoplastic film, a high-density magnetic recording medium having a satisfactory running property can be obtained by utilizing characteristics of the easy-slip coating layer on the other surface.

In the case of the above-mentioned film (3), a high-density magnetic recording medium having a good plane characteristic, in which curling of ferromagnetic metal thin film is prevented, is obtained.

If a ferromagnetic metal thin film layer is formed on the above-mentioned film (4), a high-density magnetic recording medium having an excellent running durability and an excellent S/N ratio can be obtained.

If a ferromagnetic thin film is formed on one of the worm-like modules-formed surfaces of the above-mentioned film (6), a high-density magnetic recording layer exhibiting an excellent running property on a head can be obtained.

If a ferromagnetic metal thin layer is formed on the discontinuous film layer-formed surface of the above-mentioned film (7) or (8), a high-density magnetic recording layer exhibiting an excellent running property on a head can be obtained.

The durability of a metal thin film obtained by forming a ferromagnetic thin film layer on the discontinuous film layer- or protrusion-formed surface of the above-mentioned film (9), (10), or (11) is very high, and even if recording and playback are repeated many times, separation or shaving-off of the ferromagnetic thin film does not occur.

A magnetic recording medium obtained by forming a ferromagnetic metal thin film on the above-mentioned film (12) has an excellent effect of preventing clogging in a head.

If a metal thin film layer is formed on the discontinuous film layer-formed surface of the above-mentioned film (13), a high-density magnetic recording medium having an excellent running property on a head, in which also the running property of the non-magnetic side is increased to a satisfactory level by the effect of the fine particle-containing thermoplastic film having the coating layer composed of a lubricant and laminated on the other surface, can be obtained.

The film (14) gives a polyethylene terephthalate film having an excellent function of preventing the precipitation of an oligomer, but the roughness is not specified and even if a ferromagnetic metal thin film layer is formed on the film, it is impossible because of the presence of a foreign substance in the base to provide a high-density magnetic recording medium having an enhanced S/N ratio and a reduced drop-out.

The film (15) improves the slit characteristic of the film having a magnetic material coated or vacuum-deposited thereon, but as in the case of the film (14), a high-density magnetic recording medium having an enhanced S/N ratio and a reduced drop-out cannot be obtained.

The above-mentioned film (16) gives a transparent polyester film having a reduced amount of a foreign substance in the base, but the thickness is too large and the film cannot be used as the base film of a magnetic tape. Moreover, even if the thickness is reduced and a ferromagnetic thin film is formed on the film as the base of a magnetic tape, as in the case of the above-mentioned films (1) through (13), problem arise in that a damage is caused on a magnetic head by the ferromagnetic metal thin film or a scratch is formed on the surface of the metal thin film.

The above-mentioned film (17) gives a transparent, easy-slip film, but as in the case of the above-mentioned film (16), a problem arises in that a damage is caused on a magnetic head or a scratch is formed on the surface of the metal thin film, if a ferromagnetic metal thin film is formed.

Where in order to obtain stable recording and playback characteristics, it is intended to attain uniform-contact running between the ferromagnetic metal thin film of the tape and the magnetic head in a video tape recorder, since all of ferromagnetic metal thin films have a high Young's modulus and are hard, a problem arises in that a damage is caused on the magnetic head or a scratch is formed on the surface of the metal thin film.

In view of the foregoing problems of the conventional techniques, it is an object of the present invention to provide a polyester film for forming thereon a ferromagnetic metal thin film for a magnetic recording medium, in which a ferromagnetic metal thin film layer formed on the surface has a pliability and a scratch is not formed on the metal thin film or a damage is not caused on a magnetic head when contacted with the magnetic head.

DISCLOSURE OF THE INVENTION

In accordance with one aspect of the present invention, there is provided a polyester film for forming thereon a ferromagnetic metal thin film for a magnetic recording medium, which is composed of a polyester prepared by using a germanium compound as the polymerization catalyst, wherein the Young's modulus $E_{MD}$ in the machine direction thereof and the Young's modulus $E_{TD}$ in the transverse direction thereof satisfy the requirements of $E_{MD} \geq 350$ kg/mm², $E_{TD} \geq 350$ kg/mm² and $E_{MD} \times E_{TD} \geq 250,000$ kg²/mm⁴, the refractive index $n_{ZD}$ in the thickness direction thereof satisfies the requirements of $1.480 \geq n_{ZD} \geq 1.492$, and the maximum roughness Rt of at least one surface thereof satisfies the requirement of $Rt \leq 100$ nm (hereinafter referred to as "polyester film $A_1$").

In accordance with another aspect of the present invention, there is provided a polyester film for forming thereon a ferromagnetic metal thin film for a magnetic recording medium, which comprises a laminate of polyester layers A and B formed by using a germanium compound as the polymerization catalyst, wherein the Young's modulus $E_{MD}$ in the machine direction of the laminate, the Young's modulus $E_{TD}$ in the transverse direction of the laminate and the refractive index $n_{ZD}$ in the thickness direction of the laminate satisfy the above-mentioned requirements, respectively, the maximum roughness of the outer surface of the layer A satisfies the requirement of $Rt \leq 100$ nm, fine particles are incorporated in the layer B, and the maximum roughness Rt of the outer surface of the layer B is in the range of from 30 to 150 nm (hereinafter referred to as "composite polyester film $A_8$").

In accordance with still another aspect of the present invention, there is provided a magnetic recording medium having a ferromagnetic metal thin film, which comprises a thin film containing at least one ferromagnetic material selected from the group consisting of iron, cobalt, nickel, and alloys thereof, which is formed on at least one surface of the above-mentioned polyester film $A_1$ or composite polyester film $A_8$.

BEST MODE FOR CARRYING OUT THE INVENTION

In the polyester film of the present invention, each of the Young's modulus $E_{MD}$ in the machine direction and the Young's modulus $E_{TD}$ in the transverse direction is at least 350 kg/mm² and the product of $E_{MD}$ and $E_{TD}$ is at least 250,000 kg²/mm⁴. Preferably the product of $E_{MD}$ and $E_{TD}$ is at least 280,000 kg²/mm⁴. In general, $E_{MD}$ and $E_{TD}$ can be a value of up to about 1,000 kg/mm². If the Young's modulus characteristics of the polyester film fail to satisfy the above-mentioned requirements, the mechanical properties of a magnetic recording medium prepared by forming a ferromagnetic metal thin film on the polyester film are not satisfactory, and when a magnetic tape is prepared by using the polyester film, the so-called nerve of the tape is extremely poor and uniform contact between the tape and head in a video tape recorder cannot be attained. The Young's modulus of a polyester film is determined from the rising gradient at the starting point of the stress-strain curve obtained at the tensile test measurement according to the ASTM D-882-67.

In the polyester film of the present invention, the refractive index $n_{ZD}$ in the thickness direction is in the range of from 1.480 to 1.492, preferably from 1.480 to 1.491. The refractive index $n_{ZD}$ in the thickness direction has a relationship to the hardness in the thickness direction. If $n_{ZD}$ is in the range of from 1.480 to 1.492, the apparent hardness of the metal thin film formed on the surface is optimalized, and occurrence of a scratch on the metal thin film by the mechanical contact with a video tape recorder head can be avoided and also a damage of the magnetic head can be prevented. If $n_{ZD}$ is smaller than 1.480, the hardness in the thickness direction is drastically reduced, resulting in extreme reduction of the apparent hardness of the metal thin film, and insufficient contact is caused between the metal thin film and magnetic head and the electric-magnetic conversion characteristics of the magnetic tape are degraded. If $n_{ZD}$ exceeds 1.492, the apparent hardness is drastically increased, the metal thin film is often damaged and the damage on the magnetic head becomes serious.

The refractive index is measured at 25° C. relatively to Na-D rays by using an Abbe refractometer.

The maximum roughness Rt of at least one surface of the polyester film $A_1$ of the present invention is up to 100 nm. Preferably Rt is in the range of from 5 to 100 nm, more preferably in the range of from 6 to 60 nm. Where a magnetic recording medium is prepared by forming a ferromagnetic metal thin film on one surface of this polyester film, the ferromagnetic metal thin film is formed on the surface having a maximum roughness Rt of up to 100 nm, and since the thickness of the ferromagnetic thin film is ordinarily about 0.05 to about 1.0 μm and very small, the surface configuration of the base film becomes directly reflected in the surface configuration of the ferromagnetic thin film. If the value of Rt exceeds 100 nm, the surface becomes coarse and the electric-magnetic conversion characteristics are drastically degraded, and thus the practical performance is poor.

The maximum roughness Rt is practically measured by a high-precision contact feeler-type surface roughness meter (for example, Talystep supplied by Rank Taylor Hobson Co., England), and the maximum roughness Rt is expressed by the distance between the height of the largest peak and the depth of the deepest trough in the roughness curve as determined at a cut-off value of 0.08 mm and a measurement length of 500 μm. The measurement is conducted at least 5 times and the mean value Rt is calculated.

The polyester constituting the polyester film $A_1$ of the present invention is not particularly limited, so far as the polyester is prepared by using a germanium compound as the polymerization catalyst, the Young's modulus satisfies the above-mentioned requirements and the refractive index in the thickness direction is in the range of from 1.480 to 1.492. In a polyester prepared by using a polymerization catalyst other than the germanium compound, the catalyst residue is left in the polyester as a foreign substance, and the number of coarse defects on the surface of the formed film increases and the dropout becomes conspicuous in the magnetic tape obtained by formation of a ferromagnetic thin film. As specific examples of the polyester, there can be mentioned polyethylene terephthalate, polytetramethylene terephthalate, poly-1,4-cyclohexylenedimethylene terephthalate, polyethylene-2,6-naphthalene dicarboxylate, polyethylene-p-hydroxybenzoate and polybutylene terephthalate.

The polyester may be any of a homopolyester, a copolyester and a blend. As the component to be copolymerized for the preparation of a copolyester, there can be mentioned, for example, diol components such as diethylene glycol, propylene glycol, neopentyl glycol, polyethylene glycol, p-xylylene glycol and 1,4-cyclohexanedimethanol, dicarboxylic acid components such as adipic acid, sebacic acid, phthalic acid, isophthalic acid, 2,6-naphthalenedicarboxylic acid and 5-sodium-sulfoisophthalic acid, polyfunctional dicarboxylic acids such as trimellitic acid and pyromellitic acid, and p-hydroxyethoxybenzoic acid. In the case of the copolymer, preferably the amount of the copolymerized component be up to 20 mole %.

An alkali metal salt derivative of sulfonic acid which is not reactive with the polyester or a polyalkylene glycol substantially insoluble in the polyester can be incorporated into the polyester in an amount not inhibiting the attainment of the functional effects of the present invention, for example, in an amount not exceeding 5% by weight.

The polyester can be prepared according to either the direct polymerization method or the DMT method, and in the DMT method, calcium acetate is preferably used as the ester exchange catalyst. A germanium compound is used as the polymerization catalyst at the polymerization stage. As taught in Japanese Examined Patent Publication Nos. 48-37759, 48-35954 and 48-37760, as the germanium catalyst, there can be used (a) amorphous germanium oxide, (b) crystalline germanium oxide having a size not larger than 6 μm, (c) a solution formed by dissolving germanium oxide in glycol in the presence of an alkali metal or alkaline earth metal or a compound thereof, and (d) a glycol solution of germanium oxide prepared by dissolving germanium oxide in water, adding glycol to the aqueous solution and removing water by distillation.

The polyester film $A_1$ of the present invention is prepared by shaping the above-mentioned polyester into a film, for example, by melting the polyester, extruding the melt in the form of a sheet or cylinder and biaxially drawing the extrudate. The thickness of the film is not particularly limited, but the thickness of the film is ordinarily 4 to 25 μm and preferably 4 to 21 μm.

If the polyester film $A_1$ is used as a substrate layer and a coating layer containing a polar polymer, an organic lubricant and inorganic fine particles is formed on one surface of the substrate layer, slipperiness of the film is improved, formation of wrinkles is prevented at the step of winding the film in the form of a roll, and the handling property at the processing step can be improved. Therefore, formation of this coating layer is preferred. Where both surfaces of the substrate layer have the same quality, that is, both surfaces satisfy the requirement of $Rt \leqq 100$ nm, the coating layer can be formed on any of the surfaces. However, where both surfaces differ in the quality, that is, where only one surface of the substrate layer satisfies the requirement of $Rt \leqq 100$ nm and the other surface fails to satisfy the requirements of $Rt \leq 100$ nm, the coating layer is formed on the surface that fails to satisfy the requirements of $Rt \leq 100$ nm.

In accordance with one embodiment of the present invention, there is provided a coated polyester film wherein the polyester film $A_1$ is used as the substrate layer, and a coating layer containing a polar polymer, an organic lubricant and inorganic fine particles is formed on any of the surfaces of the substrate layer when both surfaces of the substrate layer satisfy the requirement of $Rt \leq 100$ nm or the coating layer is formed on the surface failing to satisfy the requirement of $Rt \leq 100$ nm when only one surface of the substrate layer satisfies the requirement of $Rt \leq 100$ nm (hereinafter referred to as "coated polyester film $A_2$").

The coating layer formed on the coated polyester film $A_2$ contains both of the organic lubricant and inorganic fine particles. As the organic lubricant, there can be used a silicone, a wax, a fluorine compound, an aliphatic ester, a fatty acid ester and an aliphatic amide. Inorganic fine particles having a particle size of 10 to 200 nm, preferably 15 to 100 nm, are used. For example, there can be used fine particles of oxides, carbonates and sulfates of Mg, Zn, Ca, Ba, Al, Si, Ti and Mn, such as MgO, ZnO, $MgCO_3$, $CaCO_3$, $BaSO_4$, $Al_2O_3$, $SiO_2$ and $TiO_2$.

The coating layer containing the organic lubricant and inorganic fine particles further contains a polar polymer as the matrix resin for bonding the coating layer closely to the substrate layer. As the polar polymer, there can be used polyvinyl alcohol, tragacanth gum, casein, gelatin, a cellulose derivative, a water-soluble polyester, a water-soluble polyester copolymer, a polyurethane, an epoxy resin, an alkyd resin, an acrylic resin and blends thereof.

The amounts of the organic lubricant and inorganic fine particles are 2 to 15% by weight and 4 to 30% by weight, respectively, based on 100 parts by weight of the organic polymer.

Preferably, the dynamic friction coefficient of the surface of the coating layer to the metal (SUS) is not larger than 2.0 and the static friction coefficient and dynamic friction coefficient of the surface of the coating layer to the uncoated surface of the film is not larger than 3.0 and not larger than 2.0, respectively. If the dynamic friction coefficient to the metal exceeds 2.0, the handling property at the processing step is degraded. If the film/film static and dynamic friction coefficients exceed 3.0 and 2.0, respectively, wrinkles are formed on the film and the film is deformed upon winding.

Since the surface roughness of the substrate layer (polyester film $A_1$) is very low, the above-mentioned requirements of the friction coefficients are satisfied only by incorporating both of the organic lubricant and inorganic fine particles into the coating layer.

The coating layer must satisfy the requirements of the friction coefficients and have a certain fine roughness. Preferably the maximum roughness Rt of the surface of the coating layer is 30 to 150 nm, more preferably 50 to 120 nm, as measured at a cut-off value of 0.08 mm. If the Rt value exceeds 150 nm, the peak portion of the fine protrusion is reflected on the coating layer-free surface in the state where the film is wound, with the result that deformation occurs on the ferromagnetic thin film-formed surface. Where a ferromagnetic metal thin film is formed by vacuum deposition, the base film is arranged along a cooling can to deprive the vacuum-deposited metal of the latent heat, whereby elevation of the temperature of the base film as the substrate and the thermal deterioration of the base can be prevented. If the value of Rt exceeds 150 nm, the contact of the coating layer with the cooling can become insufficient and no satisfactory cooling effect is attained. If the value of Rt is smaller than 30 nm, slipperiness of the coating layer is degraded.

As a specific example of the coating layer, there can be mentioned a coating layer comprising a silicone [A], silica ($SiO_2$) particles [B], a water-soluble polyester [C], a cellulose derivative [D] and a silane coupling agent [E] at an [A]/[B]/[C]/[D]/[E] mixing ratio (weight ratio) of (5 to 20)/(10 to 40)/100/(40 to 100)/(8 to 14) and having a discontinuous film shape.

If the amounts of [A] and [B] are smaller than the lower limits of the above-mentioned ranges, the slipperiness is not satisfactory and if the amount of [A] exceeds the upper limit, the lubricant is transferred to the opposite surface and vacuum deposition is insufficient. If the amount of [B] exceeds the upper limit, the fine particles tend to fall. If the amount of [C] is smaller than the lower limit, retention of the silica particles becomes difficult, and if the amount of [C] exceeds the upper limit, a discontinuous film structure is not formed and the slipperiness is degraded. The component [D] is used for formation of the discontinuous film structure. The component [E] is used for retaining the fine particles. If the amount of [E] is smaller than the lower limit, the retention capacity is reduced, and if the amount of [E] exceeds the upper limit, the coating layer becomes too hard and is readily shaved off.

To improve the slipperiness, prevent formation of wrinkles in the state wound in the form of a roll and improve the handling property at the processing step of the polyester film $A_1$ of the present invention, the polyester film $A_1$ can be constructed by a laminate of layers A and B, each being composed of a polyester, wherein fine particles are incorporated into the layer B so that the maximum roughness Rt of the surface on the side of the layer B is 30 to 150 nm.

Thus, in accordance with another embodiment of the present invention, there is provided a polyester film comprising a laminate of layers A and B, each being composed of a polyester prepared by using a germanium compound as the polymerization catalyst, wherein fine particles are incorporated in the layer B, each of the Young's modulus $E_{MD}$ in the machine direction of the laminate and the Young's modulus $E_{TD}$ in the transverse direction of the laminate is at least 350 kg/mm$^2$, the product of the moduli ($E_{MD} \times E_{TD}$) is at least 250,000 kg$^2$/mm$^4$, the refractive index $n_{ZD}$ in the thickness direction is in the range of from 1.480 to 1.492, the outer surface of the layer A satisfies the requirements of $Rt \leq 100$ nm and the maximum roughness Rt of the outer surface of the layer B is in the range of from 30 to 150 nm (hereinafter referred to as "composite polyester film $A_8$").

The same polyesters as mentioned above with respect to the polyester film $A_1$ can be used as the polyester constituting the layers A and B of the composite polyester film $A_8$. The polyester constituting the layer A may be different from the polyester constituting the layer B, but preferably the same polyester is used for both layers A and B.

The fine particles incorporated in the layer B of the composite polyester film $A_8$ may be those formed of the residue of the polymerization catalyst for formation of the polyester resin, externally added particles, or a mixture of both particles. As the fine particles formed of the residue of the polymerization catalyst for formation of the polyester resin, there can be mentioned fine particles of a polymer-insoluble composition formed of a catalyst residue containing Ca, Si, Mn, Mg, Sb, Ge, P, Li, K and Na. As the externally added particles, there can be mentioned particles of aluminum oxide, silicon oxide, barium sulfate and calcium carbonate, although the particles that can be used are not limited to those mentioned above.

The particle diameter of the fine particles incorporated in the layer is not particularly limited, but preferably the particle diameter is 0.5 to 5.0 μm, more preferably 1.0 to 3.0 μm. The amount of the fine particles added is not particularly limited, but preferably the amount of the fine particles be 0.01 to 1.0% by weight, more preferably 0.02 to 0.5% by weight. If the particle diameter and amount of the fine particles are below the lower limits of the above-mentioned ranges, the slipperiness of the layer B is degraded, resulting in formation of wrinkles and reduction of the handling property. If the particle diameter and amount of the fine particles exceed the upper limits, the layer B is excessively roughened, and in the film-wound state, the peak portion of the fine protrusion is reflected onto the other surface layer and deformation is caused on the surface on which a vacuum deposition film is to be formed, and no good results can be obtained. Furthermore, at the vacuum deposition step, the contact with the cooling can be insufficient, and no satisfactory cooling effect can be obtained.

The maximum roughness Rt of the outer surface of the layer B of the composite polyester film $A_8$ is 30 to 150 nm, preferably 50 to 120 nm. If Rt exceeds the upper limit, the peak portion of the roughness is reflected onto the other surface layer in the film-wound state and deformation is caused on the surface on which a ferromagnetic thin film is to be formed, and no good results can be obtained. Furthermore, at the vacuum deposition step, the contact with the cooling can is insufficient and no satisfactory cooling effect can be attained. If Rt is smaller than the lower limit, the slipperiness of the layer B is degraded, resulting in formation of wrinkles and reduction of the handling property.

If fine particles are incorporated in the substrate layer of the coated polyester film $A_2$ so that the maximum roughness Rt of the surface of the substrate layer is adjusted to 5 to 100 nm, the surface of the ferromagnetic thin film after formation of the metal thin film on the polyester film is appropriately roughened and the shaving resistance of the metal thin film to the magnetic head is improved.

Similarly, preferably fine particles is incorporated in the layer A of the composite polyester film $A_8$ so that the maximum roughness Rt of the outer surface of the layer is adjusted to 5 to 100 nm.

In the fine particles to be incorporated in the substrate layer of the coated polyester film $A_2$ or the layer A of the composite polyester film $A_8$, the particle diameter before the addition to the polyester is 10 to 300 nm, preferably 30 to 200 nm, and for example, inorganic particles of MgO, ZnO, $MgCO_3$, $CaCO_3$, $BaSO_4$, $SiO_2$, $Al_2O_3$, and $TiO_2$ are used, although inorganic particles that can be used are not limited to those mentioned above. The content of the fine particles is 0.003 to 1.0% by weight, and the height of the fine surface protrusions formed on the surface of the polyester film by the fine particles is preferably 5 to 100 nm, more preferably 6 to 60 nm, and the number of the fine surface protrusions is preferably $10^3$ to $10^7$ per $mm^2$, more preferably $10^3$ to $10^6$ per $mm^2$.

The height of the fine surface protrusions can be measured according to the same method as described hereinafter with respect to knotty protrusions explained hereinafter. If the height of the fine surface protrusions is smaller than 5 nm or the number of the fine surface protrusions is smaller than the lower limit of the above-mentioned range, the surface of the ferromagnetic metal thin film formed on the surface of the base film becomes too smooth and the metal film is easily shaved off by the magnetic head. If the height of the surface protrusions exceeds 100 nm of the number of the surface projections exceeds $10^7$ per $mm^2$, the surface of the metal thin film formed on the base film becomes coarse and the electric-magnetic conversion characteristics are degraded, and no practical performance is exerted.

If a discontinuous film composed mainly of a water-soluble polymer and having a height smaller than 30 nm is formed on the outer surface of the substrate layer of the coated polyester film $A_2$ (the surface on which the coating layer comprising the polar polymer, organic, lubricant and inorganic fine particles is not formed), formation of a scratch is minimized on the surface of the substrate layer at the tape-forming step by dint of the presence of the discontinuous film, and the magnetic film-formed surface of the film becomes more slippery, and therefore, at the time of actual running in a video tape recorder, occurrence of the sticking phenomenon or formation of a scratch by the contact with a rotary head drum can be much controlled.

Similarly, preferably a discontinuous film composed mainly of a water-soluble polymer and having a height smaller than 30 nm is formed on the outer surface of the layer A of the composite polyester film $A_8$.

In the present invention, by the term discontinuous film" is meant a film present in the net-like form and/or the dotty state on the surface of the polyester film, and when the film surface is observed by an electron microscope photograph (500 to 100,000 magnifications), it is seen that this discontinuous film partially covers the surfaces of the polyester film. Preferably the discontinuous film cover 10 to 90%, more preferably 30 to 80%, of the surface of the polyester film.

In the case of the polyester film having a single-layer structure, this discontinuous film is formed on the surface opposite to the surface on which the coating layer containing the polar polymer, organic lubricant and inorganic fine particles is formed, and in the case of the polyester film having a laminate structure of layers A and B, the discontinuous film is formed on the outer surface of the layer A, whereby the effect of preventing formation of a scratch at the tape-preparing step, the effect of improving slipperiness of the thin film-formed surface after formation of the magnetic thin film and the effect of preventing occurrence of the sticking phenomenon or formation of a scratch upon contact with a rotary drum at the time of actual running in a video tape recorder can be enhanced.

This discontinuous film is formed mainly of a water-soluble polymer. Polymers having a polar group such as a hydroxyl group, an ether group, and ester group, an amide group, a methoxy group or a hydroxypropyl group and a molecular weight of 10,000 to 2,000,000, preferably 100,000 to 1,000,000, are used as the water-soluble polymer constituting the discontinuous film. If the molecular weight is lower than 10,000, the film becomes soft, retention of the structure is difficult and the durability is degraded. If the molecular weight exceeds 2,000,000, the film becomes hard and brittle, and the durability is degraded. As specific examples of the water-soluble polymer, there can be mentioned polyvinyl alcohol, tragacanth gum, gum arabic, casein, gelatin, methyl cellulose, hydroxyethyl cellulose carboxymethyl cellulose and a water-soluble polyester-ether copolymer. Blends of these polymers can also be used. Because of the polarity of the water-soluble polymer, the adhesion strength of the ferromagnetic thin film increases.

Where this discontinuous film is formed on the surface of a polyester film substantially free of fine particles, preferably inorganic fine particles are incorporated in this discontinuous film. If inorganic fine particles are thus incorporated, a high durability under severe conditions (for example, under high-temperature and high-humidity conditions) can be imparted to the vacuum deposition film. Where this discontinuous film is formed on the surface of a polyester film containing fine particles, it is not absolutely necessary to incorporated inorganic fine particles into this discontinuous film.

The kind of the inorganic fine particles to be incorporated in the discontinuous film is not particularly limited. For example, there can be mentioned fine particles of oxides, carbonates and sulfates of Mg, Zn, Ca, Ba, Al, Si, Ti and Mn. As specific examples, there can be mentioned fine particles of $MgO$, $ZnO$, $MgCO_3$, $CaCO_3$, $BaSO_4$, $SiO_2$ and $TiO_2$. These inorganic fine particles may be used singly or a plurality of kinds of inorganic fine particles may be used in combination.

Preferably the average particle diameter of the inorganic fine particles to be incorporated into the discontinuous film be 3 to 50 nm, more preferably 5 to 40 nm. By the average particle diameter referred to herein is meant the average particle diameter measured by the so-called microscope method. More specifically, with respect to the individually particles placed in the visual field of an electron microscope, the distance between particle-sandwiching two parallel lines extending in an optional certain direction is measured and the arithmetic mean of the so-measured distances is calculated. The number of particles to be measured is ordinarily at least 200. The measurement of the particle diameter by the microscope method is described, for example, on pages 15 and 16 of "Chemical Engineering II" written by Mr. Yoshito Oyama (Iwanami Complete Book 254 published by Iwanami Shoten on Mar. 30, 1970). If the average particle diameter is too small, the running property of the vacuum deposition film formed by vacuum-depositing a magnetic material on the discontinuous film is not improved, and if the average particle diameter is too large, the electric-magnetic conversion characteristics are degraded. The shape of the fine particles is not particularly limited, and for example, fine particles having a spherical shape, an ellipsoidal shape, a rectangular shape or a cubic shape can be used.

Where inorganic fine particles are incorporated in the discontinuous film, preferably the amount of the inorganic fine particles incorporated is 5 to 50 parts by weight, more preferably 10 to 40 parts by weight, per parts by weight of the water-soluble polymer (100 parts by weight of the sum of the water-soluble polymer and coupling agent where a silane coupling agent or titanium coupling agent is incorporated in the discontinuous film, as described hereinafter). If the content of the inorganic fine particles is within the above-mentioned range, falling of the inorganic fine particles from the discontinuous film is prevented ad the electric-magnetic conversion characteristics are improved.

The inorganic fine particles incorporated in the discontinuous film are present in the interior of the continuous film and on the surface of the discontinuous film, and preferably the number of the inorganic fine particles present on the surface of the discontinuous film is $10^4$ to $10^{11}$ per $mm^2$. If the number of the inorganic fine particles present on the surface exceeds $10^{11}$ per $mm^2$, the electric-magnetic conversion characteristics of the magnetic surface, especially the S/N ratio, are degraded. Moreover, the fine particles tend to fall. The number of the particles present on the surface can be determined by the observation by an electron microscope.

Where the discontinuous film is formed on the surface of the polyester film substantially free of fine particles, the height of the discontinuous film is not larger than 30 nm, preferably 3 to 10 nm. Where the discontinuous film is formed on the surface of the polyester film containing fine particles, the height of the discontinuous film is not larger than 30 nm, preferably 3 to 10 nm, and is smaller than the height of the fine surface protrusion formed on the surface of the polyester film by the fine particles incorporated in the polyester film. In each case, if the height of the discontinuous film is too large, the electric-magnetic conversion characteristics, especially the S/N ratio, of the magnetic recording medium after formation of the metal thin film are degraded. Where the discontinuous film is formed on the surface of the polyester film containing the fine particles, if the height of the discontinuous film is larger than the height of the fine surface projections formed on the surface of the film by the fine particles contained in the polyester film, the effect of preventing clogging of the head by the fine surface protrusion cannot be manifested.

The height of the discontinuous film is a value obtained by determining the average distance between the average height of the peaks and the average depth of the troughs in the section curve obtained by a contact feeler type surface roughness meter.

Preferably a silane coupling or titanium coupling agent is incorporated in the discontinuous film in the present invention. If a silane coupling agent or titanium coupling agent is incorporated, the adhesion between the discontinuous film and the polyester film and the fine particle-retaining force in the case of the fine particle-containing discontinuous film are much increased.

The silane coupling agent is an organic silicon-containing monomer having at least two different reactive groups in the molecule. One reactive group is a methoxy group, an ethoxy group, a silanol group or the like, and the other reactive group is a vinyl group, an epoxy group, a methacrylic group, amino acid group, mercapto group or the like. Reactive groups capable of being bonded to the side chain and terminal group of the polymer blend structure and the polyester are selected. As the silane coupling agent, there can be mentioned vinyltrichlorosilane, vinyltriethoxysilane, vinyltris($\beta$-methoxyethoxy)silane, $\gamma$-glycidoxypropyltrimethoxysilane, $\gamma$-methacryloxypropyltrimethoxysilane, N-$\beta$-aminoethyl)-$\gamma$-aminopropylmethyldimethoxysilane, $\gamma$-chloropropyltrimethoxysilane, $\gamma$-mercaptopropyltrimethoxysilane and $\gamma$-aminopropyltriethoxysilane.

Preferably the amount of the silane coupling agent or titanium coupling agent incorporated in the discontinuous film is up to 50 parts by weight, more preferably 1 to 40 parts by weight, per 100 parts by weight of the water-soluble polymer. If the silane coupling agent or titanium coupling agent is incorporated in an amount within this range, not only the adhesion between the discontinuous film and the polyester film and the force of retaining the fine particles in the discontinuous film but also the adhesion strength of the vacuum deposition film can be improved, and the brittleness of the discontinuous film is eliminated.

The discontinuous film can be formed on the surface of the substrate layer of the coated polyester film $A_2$ having fine particles incorporated in the substrate layer. Furthermore, the discontinuous film can be formed on the outer surface of the layer A of the composite polyester film $A_8$ having fine particles incorporated in the layer A. In these cases, inorganic fine particles need not be incorporated in the discontinuous film, and the height of the discontinuous film is preferably not larger than 30 nm. More specifically, if fine particles are incorporated in the substrate layer of the coated polyester film $A_2$ and a discontinuous film composed mainly of a water-soluble polymer and having a height not larger than 30 nm is formed on the outer surface of the substrate layer, or if fine particles are incorporated in the layer A of the composite polyester film $A_8$ and a discontinuous film composed mainly of a water-soluble polymer and having a height not larger than 30 nm is formed on the outer surface of the layer A, formation of a scratch is minimized on the discontinuous film-formed surface because of the presence of the discontinuous film, and when a magnetic thin film is formed on this surface, slipperiness of the thin film-formed surface is further improved, and at the time of actual running in a video tape recorder, the effect of preventing occurrence of the sticking phenomenon and formation of a scratch by the contact with the rotary drum head is further enhanced.

Instead of the discontinuous film, knotty protrusions can be formed on the outer surface of the substrate layer of the coated polyester film $A_2$ (the surface on which the coating layer comprising the polar polymer, organic lubricant and inorganic fine particles is not formed) or the outer surface of the layer A of the composite polyester film $A_8$.

If such knotty protrusions are formed on the surface opposite to the surface, on which the coating layer comprising the polar polymer, organic lubricant and inorganic fine particles is formed, in the case of the polyester film having a single-layer structure, or if such knotty protrusions are formed on the outer surface of the layer A in the case of the polyester film having a laminate structure of layers A and B, the running property of the ferromagnetic metal thin film formed on the knotty protrusion-formed surface to the magnetic head is improved, and the running capacity of the tape under high-temperature and high-humidity conditions is improved.

The height of the knotty protrusions is not larger than 30 nm, preferably 5 to 30 nm. If the height is too large, the roughness of the ferromagnetic metal thin film formed on the knotty protrusions-formed surface increases and the electric-magnetic conversion characteristics are degraded.

The diameter of the knotty protrusions (the diameter of the bottom face) is not particularly limited, but preferably the diameter is 0.05 to 1.0 μm, more preferably 0.1 to 0.7 μm. The dimension ratio H/D of the height H to the diameter D in the knotty protrusions is preferably from 0.01 to 0.1 and more preferably from 0.02 to 0.1. Preferably the number of the knotty protrusions is $10^4$ to $10^8$ per mm$^2$, more preferably $10^5$ to $10^7$ per mm$^2$. If the height or diameter of the knotty protrusions is too small or if the number of the knotty protrusions is too small, the running property of the metal thin film formed on the knotty protrusion-formed surface to the magnetic head is degraded and the running performance of the tape under high-temperature and high-humidity conditions is not satisfactory. If the height or diameter of the knotty protrusions is too large or if the number of the knotty protrusions is too large, the metal thin film formed on the knotty protrusion-formed surface becomes coarse and the electric-magnetic conversion characteristics of the magnetic recording medium are degraded. If the dimension ratio H/D of the height H to the diameter D in the knotty protrusion is higher than 0.1, the knotty protrusion are easily shaved off by rolls at various steps for processing the film, and also protrusions formed on the taps obtained by forming a recording layer on the film and forming the film into a magnetic tape are readily shaved off and no good results can be obtained. If the ratio H/D is lower than 0.01, the protrusions formed on the final magnetic tape are smooth, and the running property of the ferromagnetic metal thin film is degraded and the running performance of the tape under high-temperature and high-humidity conditions is not satisfactory.

The height of the knotty protrusions is determined from a section curve obtained at more than 1000 magnifications in the lateral direction and more than 1,000,000 magnifications in the longitudinal direction by using a high-precision contact feeler type surface roughness meter. In one trough-peak in the section curve corresponding to one of the shapes of the respective knotty protrusions, each consisting of trough-peak-trough, the distance between the peak of the protrusion and the average depth of two troughs adjacent to the protrusion is defined as the height of each projection. The height is thus determined with respect to 20 protrusions, and the mean value is defined as the height of the knotty protrusions.

The diameter and number of the knotty protrusions can be measured by a differential interference optical microscope or an electron microscope, but preferably the measurement is conducted by using an electron microscope having a magnifying power of at least 5,000. The diameter is determined by observing at least 10 knotty protrusions and calculating the mean value, and the number is determined by taking a microscope photograph, counting the number of the knotty protrusions in the photograph and converting the counted value to a value per mm$^2$.

The material of the knotty protrusion is not particularly limited, so far as the knotty protrusion satisfy the above-mentioned configuration requirements. However, an organic compound is preferred as them material constituting the knotty protrusions. For example, there can be used polystyrene, polyethylene, polyesters, polyacrylic acid esters, polymethyl methacrylate, polyepoxy resins, polyvinyl acetate, acrylic/styrene copolymers, acrylic copolymers, various modified acrylic resins, styrene/butadiene copolymers and various modified styrene/butadienes. Organic compounds having an alcohol group, a carboxylic group or an ester group and having a polarity are especially preferred. The polar group exerts the function of increasing the adhesion to the metal thin film. Furthermore, preferably the glass transition temperature of the organic compound is lower than 90° C.

To increase the adhesion between the knotty protrusion and the polyester film, preferably a silane coupling agent or titanium coupling agent is interposed between the knotty protrusions and the polyester film. The amount of the coupling agent used is up to 20 parts by weight, preferably 1 to 10 parts by weight, per 100 parts by weight of the amount of the knotty protrusions. If the amount of the coupling agent exceeds the above-mentioned range, the coupling agent is present in too large an amount on the surfaces of the knotty protrusions and the knotty protrusions tend to be brittle.

A coating layer containing a polar polymer, an organic lubricant and inorganic fine particles can be formed on the outer surface of the layer B of the composite polyester film $A_8$. If this coating layer is formed, slipperiness of the film are further improved, and the handling property at the processing step is improved.

The process for the preparation of the polyester film of the present invention will now be described.

A starting polyester prepared by using a germanium compounds as the polymerization catalyst, to which a predetermined amount of predetermined fine particles are added according to need, is melt-extruded by an ordinary film-forming apparatus, and the extrudate is cooled and solidified. The extrudate is monoaxially drawn at a draw ratio of 3 to 5 at 70° to 110° C. and is then drawn at a draw ratio of 3 to 5 at a temperature of 90° to 130° C. in the direction orthogonal to the first drawing direction. Then, the drawn extrudate is further drawn at a draw ratio of 1.1 to 2.0 in the first drawing direction and is then heat-treated at 150° to 250° C. Simultaneously with the heat treatment or after the heat treatment, drawing may be carried out at a draw ratio of 1.05 to 2.0 in the orthogonal direction. Thus, a polyester film satisfying the requirements of the Young's modulus and the maximum roughness Rt can be obtained, but the requirement of the refractive index $n_{ZD}$ in the thickness direction is not always satisfied in the obtained polyester film. The requirement of the present invention must be satisfied by appropriately controlling the conditions of the film-forming apparatus and the conditions of the starting polyester. For example, the requirement of $n_{ZD}$ in the range of from 1.480 to 1.492 can be satisfied if polyethylene terephthalate having a softening point of 254° to 260° C., which has been prepared by using a germanium compound as the polymerization catalyst, is used as the starting polyester, the draw ratio at the first drawing is set to 3.0 to 3.5, the draw ratio at the drawing in the orthogonal direction is set to 3.3 to 4.0, the draw ratio at the re-drawing in the first drawing direction is set to 1.4 to 2.0 and the heat treatment is carried out at a temperature of 180° to 210° C., or the heat treatment is carried out at a temperature of 180° to 210° C. after the drawing in the orthogonal direction or the drawing is carried out at a draw ratio of 1.05 to 2.0 in the orthogonal direction after the heat treatment.

The so-called co-extrusion technique can be adopted for formation of a polyester film having a laminate structure of layers A and B. More specifically, in the above-mentioned preparation process, the starting polyester for the layer A and the starting polyester containing predetermined fine particles for the layer B are molten and co-extruded.

Where the coating layer containing the polar polymer, organic lubricant and inorganic fine particles is formed, in the above-mentioned preparation process, after the first monoaxial drawing and before the subsequent drawing in the orthogonal direction, a coating liquid containing the polar polymer, organic lubricant and inorganic fine particles is coated on one surface (the surface on which the coating layer is to be formed) of the monoaxially longitudinally drawn film, and the coating is dried at 100° to 120° C. Namely, the coating layer can be formed by adding these steps to the above-mentioned preparation process.

The discontinuous film composed mainly of the water-soluble polymer can be formed by addition adopting the steps of coating a solution containing the predetermined water-soluble polymer on one surface of the monoaxially longitudinally drawn film after the first monoaxial drawing and before the subsequent drawing in the orthogonal direction and drying the coating at 100° to 120° C. to the above-mentioned preparation process. Predetermined inorganic fine particles and/or a predetermined silane coupling agent can be incorporated into the coating liquid according to need.

The knotty protrusion can be formed by additionally adopting steps of coating a coating liquid containing a granular compound forming knotty protrusions on one surface of the monoaxially longitudinally drawn film after the first monoaxial drawing and before the subsequent drawing in the orthogonal direction, and drying the coating at 100° to 120° C. to the above-mentioned preparation process.

An aqueous dispersion formed by incorporating a thickening agent or a surface active agent to an emulsion of the above-mentioned organic compound is used as the coating liquid containing the granular compound forming knotty protrusions.

A coupling agent such as a silane coupling agent of the aminosilane type or a titanium coupling agent can be incorporated in the coating liquid according to need. Preferably the glass transition temperature of the organic compound is lower than 90° C. Smooth protrusions as mentioned above can be obtained by carrying out the drawing at a temperature lower than the glass transition temperature and carrying out the heat treatment at a temperature of at least 150° C.

The starting material and film-forming conditions are optionally selected and are not limited to those mentioned above. The polyester film and composite polyester film of the present invention are preferably used for preparing a magnetic recording medium by forming a ferromagnetic metal thin film on at least one surface. The surface on which the ferromagnetic metal thin film is to be formed is the surface satisfying the requirement of $Rt \leq 100$ nm in the case of the polyester film al. If both surfaces of the polyester film $A_1$ satisfy the requirement of $R \leq 100$ nm, the ferromagnetic metal thin film can be formed on both surfaces.

In the case of the coated polyester film $A_2$, the ferromagnetic metal thin film is formed on the surface opposite to the surface on which the coating layer containing the polar polymer, organic lubricant and inorganic fine particles is formed. In the case of the composite polyester film $A_8$, the ferromagnetic metal thin film is formed on the surface of the layer A. When the discontinuous film or knotty protrusions are formed on the surface of the coated polyester film $A_2$ or composite polyester film $A_8$, the ferromagnetic metal thin film is formed on the surface on which the discontinuous film or knotty protrusions are formed.

The maximum roughness of the surfaces on which the ferromagnetic thin film is to be formed, expressed by the Rt value at a cut-off value of 0.08 mm, is up to 100 nm, preferably 5 to 100 nm, more preferably 6 to 60 nm.

A known material can be used as the ferromagnetic metal thin film and the material is not particularly limited. For example, a ferromagnetic material composed of iron, cobalt, nickel or an alloy thereof is preferably used. The ferromagnetic metal thin film can be vacuum-deposited on the base film directly, through fine particles arranged on the base film or an undercoat thin film of aluminum, titanium or chromium according to customary procedures.

Preferably thickness of the metal thin film is 0.05 to 0.25 μm, more preferably 0.10 to 0.20 μm. If the thickness is smaller than 0.05 μm, the function of the metal thin film as the magnetic layer is reduced, and if the thickness exceeds 0.25 μm, the electric-magnetic conversion characteristics in the high region are degraded.

The present invention will now be described with reference to the following examples.

The evaluation and measurement methods adopted in the examples are as follows.

(1) The dynamic friction coefficient of the coating layer-formed surface of the film of the present invention to the metal was determined by travelling the film in the form of a tape on a stationary guide rod of SUS at an angle of 180°.

(2) The film/film friction coefficient of the film of the present invention was determined according to the method of ASTM D-1894-63.

(3) The characteristics of a magnetic recording medium, that is, a tape, obtained by forming a ferromagnetic thin film on the film of the present invention were determined by using a commercially available 8-mm video tape recorder. The video S/N ratio and drop-out (DO) were measured as the electric-magnetic conversion characteristics. At the measurement of the S/N ratio and drop-out, a signal was supplied from the TV test signal generator, and a video noise meter and a drop-out counter were used. The video S/N ratio was measured by comparison with that of a commercially available 8-mm video tape, regarded as zero decibel (dB). Drop-outs in which the attenuation of the playback signal was larger than −16 dB and the length was longer than 15 microseconds were measured. The S/N ratio and drop-out were first measured at normal temperature and normal relative humidity (25° C. and 60% RH) just after the preparation of the tape for determining the initial characteristics. Then, the video recording and playback were repeated 100 times, and the S/N ratio and drop-out of the tape were examined. At this measurement, the surface of the tape and the magnetic head were examined. Moreover, formation of a scratch on the tape and a damage of the magnetic head was checked.

EXAMPLE 1

Bishydroxymethyl terephthalate was prepared from dimethyl terephthalate and ethylene glycol by using magnesium acetate as the catalyst. Polymerization of bishydroxymethyl terephthalate was carried out by using a germanium oxide catalyst, and substantially unoriented, amorphous polyethylene terephthalate having a softening point off 285° C. which was substantially free of fine particles formed from the polymerization catalyst residue and the like, was obtained. A starting material formed by adding 0.04% by weight of $SiO_2$ particles having a particle diameter of 45 nm to this polyethylene terephthalate was melt-extruded on a rotary drum maintained at about 20° C. and the extrudate was drawn at a draw ratio of 3.0 in the machine direction at 90° C. Then, the following aqueous coating liquid was coated on one surface at a solid concentration of 20 mg/m².

| | |
|---|---|
| Polydimethylsiloxane emulsion (having solid concentration of 25% by weight) | 0.05% by weight |
| Ultrafine silica having average particle diameter of 25 nm | 0.06% by weight |
| Water-soluble polyester copolymer (1/1 copolymer of acid component comprising 40 mole % of terephthalic acid, 33 mole % of isophthalic acid, 20 mole % of adipic acid and 7 mole % of 5-sodium sulfoisophthalic acid and glycol component comprising 40 mole % of diethylene glycol and 60 mole % of ethylene glycol) | 0.35% by weight |
| Methyl cellulose | 0.25% by weight |
| Silane coupling agent [N-β-(aminoethyl)-γ-aminopropylmethyl-dimethoxy-silane] | 0.035% by weight |

Then, the coated extrudate was passed through a stenter, dried at 115° C., pre-heated and drawn in the transverse direction. The draw ratio at the transverse drawing was 3.8. Then, the drawn extrudate was heat-treated at 200° C. and drawn at a draw ratio of 1.17 in the transverse direction. Thus, there was obtained a polyethylene terephthalate film in which $3 \times 10^5$/mm² of fine surface protrusions having an average height of 20 nm were formed, the Rt value was 30 nm, the refractive index ($n_{ZD}$) in the thickness direction was 30 nm, a coating layer containing the silicone and silica fine particles having Rt of 86 nm and a dynamic friction coefficient of 0.70 to the metal was formed on one surface, the thickness was 10 μm, the Young's modulus in the machine direction was 420 kg/mm², the Young's modulus in the transverse direction was 750 kg/mm² the static/dynamic friction coefficient between the front and back surfaces of the film was 0.9/0.6.

A cobalt/nickel alloy thin film having a thickness of 150 nm was vacuum-deposited on the polyester film on the surface on which the coating layer was not formed. A protecting film layer comprising an epoxy resin, a silicone and a silane coupling agent was formed in a thickness of 0.1 μm on the surface of the cobalt/nickel alloy thin film, and a back-coat layer having a thickness of 1 μm, which comprises a carbon black-containing epoxy resin, a silicone and a silane coupling agent, was formed on the surface of the opposite layer B. Then, the tape was cut at a predetermined width in the machine direction to form a magnetic tape.

The characteristics of the obtained magnetic tape are shown in Table 1.

EXAMPLE 2

A polyester film having a thickness of 10 μm was prepared in the same manner as described in Example 1 except that re-drawing was carried out at a draw ratio of 1.5 in the machine direction at a temperature of 110° C. before the heat treatment at 200° C. and the drawing in the transverse direction, simultaneous with the heat treatment, was not carried out. In this film, $2.5 \times 10^5$ mm² of fine surface protrusions having an average height of 19 nm were formed, Rt was 29 nm, $n_{ZD}$ was 1.488, a coating layer containing the silicone and silica fine particles and having Rt of 83 nm, and a dynamic friction coefficient of 0.75 to the metal was formed on one surface, the Young's modulus of the film in the machine direction was 630 kg/mm$^2$, the Young's modulus in the transverse direction was 450 kg/mm$^2$ and the static/dynamic friction coefficient of the film between one surface and the other surface was 0.9/0.7. By using this film, a magnetic tape was prepared in the same manner as described in Example 1. The characteristics of the obtained magnetic tape are shown in Table 1.

EXAMPLE 3

A polyester film having a thickness of 10 μm was prepared in the same manner as described in Example 1 except that re-drawing was carried out at a draw ratio of 1.4 in the machine direction at a temperature of 110° C. before the heat treatment at 200° C. and the draw ratio of the transverse drawing conducted simultaneously with the heat treatment was subjected to 1.10. In this film, 2.4×10$^5$/mm$^2$ of fine surface protrusions having an average height of 19 nm were formed, Rt was 29 nm, n$_{ZD}$ was 1.484, a coating layer containing the silicone and silica fine particles and having Rt of 82 nm and a dynamic friction coefficient of 0.77 to the metal was formed on one surface, the Young's modulus of the film in the machine direction was 580 kg/mm$^2$, the Young's modulus in the transverse direction was 600 kg/mm$^2$ and the static/dynamic friction coefficient of the film between the front and back surfaces was 1.0/0.8. By using this film, a magnetic tape was prepared in the same manner as described in Example 1. The characteristics of the obtained magnetic tape are shown in Table 1.

EXAMPLE 4

A polyester film having a thickness of 10 μm was prepared in the same manner as described in Example 3 except that the draw ratio at the drawing in the machine direction before the heat treatment at 200° C. was changed to 1.2 and the draw ratio at the transverse drawing conducted simultaneously with the heat treatment was changed to 1.08. In this film, 3.0×10$^5$/mm$^2$ of fine surface projections having an average height of 20 nm were formed, Rt was 30 nm, n$_{ZD}$ was 1.492, a coating layer containing the silicone and silica fine particles and having Rt of 83 nm and a dynamic friction coefficient of 0.75 to the metal was formed on one surface, the Young's modulus of the film in the machine direction was 500 kg/mm$^2$, the Young's modulus in the transverse direction was 530 kg/mm$^2$ and the static/dynamic friction coefficient of the film between the front and back surfaces was 0.9/0.7. By using this tape, a magnetic tape was prepared in the same manner as described in Example 1. The characteristics of the obtained magnetic tape are shown in Table 1.

EXAMPLE 5

A polyester film having a thickness of 10 μm was prepared in the same manner as described in Example 1 except that the particle diameter of SiO$_2$ particles added to the starting material was changed to 200 nm. In this film, 4.0×10$^4$/mm$^2$ of fine surface protrusions having an average height of 45 nm were formed, Rt was 50 nm, n$_{ZD}$ was 1.489, a coating layer containing the silicone and silica fine particles and having Rt of 86 nm and a dynamic friction constant of 0.75 to the metal was formed on one surface, the Young's modulus of the film in the machine direction was 420 kg/mm$^2$, the Young's modulus in the transverse direction was 750 kg/mm$^2$ and the static/dynamic friction coefficient of the film between the front and back surfaces was 0.8/0.6. By using this film, a magnetic tape was prepared in the same manner as described in Example 1. The characteristics of the obtained magnetic film are shown in Table 1.

EXAMPLE 6

A polyester film having a thickness of 10 μm was prepared in the same manner as described in Example 1 except that the amount of the coating liquid coated was changed to 40 mg/m$^2$. In this film, 3.0×10$^5$/mm$^2$ of fine surface protrusions having an average height of 20 nm were formed, Rt was 30 nm, n$_{ZD}$ was 1.489, a coating layer containing the silicone and silica fine particles and having Rt of 110 nm and a dynamic friction coefficient of 0.60 to the metal was formed on one surface, the Young's modulus of the film in the machine direction was 420 kg/mm$^2$, the Young's modulus in the transverse direction was 750 kg/mm$^2$ and the static/dynamic friction coefficient of the film between the front and back surfaces was 0.7/0.4. By using this film, a magnetic tape was prepared in the same manner as described in Example 1. The characteristics of the obtained magnetic tape are shown in Table 1.

EXAMPLE 7

A polyester film having a thickness of 10 μm was prepared in the same manner as described in Example 1 except that the draw ratio at the transverse drawing conducted simultaneously with the heat treatment at 200° C. was changed to 1.12. In this film, 3.0×10$^5$/mm$^2$ of fine surface protrusions having an average height of 21 nm were formed, Rt was 30 nm, n$_{ZD}$ was 1.490, a coating layer containing the silicone and silica fine particles and having Rt of 86 nm and a dynamic friction coefficient of 0.70 to the metal was formed on one surface, the Young's modulus of the film in the machine direction was 410 kg/mm$^2$, the Young's modulus in the transverse direction was 640 kg/mm$^2$ and the static/dynamic friction coefficient of the film between the front and back surfaces was 0.9/0.6. By using this film, a magnetic tape was prepared in the same manner as described in Example 1 The characteristics of the obtained magnetic tape are shown in Table 1.

EXAMPLE 8

A polyester film having a thickness of 10 μm was prepared in the same manner as described in Example 1 except that the particle size of SiO$_2$ particles incorporated in the starting material was changed to 90 nm and the amount of SiO$_2$ particles added was changed to 0.8% by weight. In this film, 8.0×10$^6$/mm$^2$ of fine surface protrusions having an average height of 33 nm were formed, Rt was 40 nm, n$_{ZD}$ was 1.489, a coating layer containing the silicone and silica fine particles and having Rt of 40 nm and a dynamic friction coefficient of 0.70 to the metal was formed on one surface, the Young's modulus of the film in the machine direction was 420 kg/mm$^2$, the Young's modulus in the transverse direction was 750 kg/mm$^2$ and the static/dynamic friction coefficient of the film between the front and back surfaces was 0.7/0.5. By using this film, a magnetic tape was prepared in the same manner as described in Example 1. The characteristics of the obtained film and magnetic tape are shown in Table 1.

EXAMPLE 9

A polyester film having a thickness of 10 μm was prepared in the same manner as described in Example 5 except that the amount of SiO₂ particles added having a particle diameter of 200 nm was changed to 0.006% by weight. In this film, $5.0 \times 10^3/mm^2$ of fine surface protrusions having an average height of 45 nm were formed, Rt was 49 nm, $n_{ZD}$ was 1.489, a coating layer containing the silicone and silica particles and having Rt of 86 nm and a dynamic friction coefficient of 0.70 to the metal was formed on one surface, the Young's modulus of the film in the machine direction was 420 kg/mm², the Young's modulus in the transverse direction was 750 kg/mm² and the static/dynamic friction coefficient of the film between the front and back surfaces was 0.9/0.7. By using this film, a magnetic tape was prepared in the same manner as described in Example 5. The characteristics of the obtained film and magnetic tape are shown in Table 1.

EXAMPLE 10

A polyethylene film having a thickness of 10 μm, Rt of 30 nm and a refractive index $n_{ZD}$ of 1.489 in the thickness direction and comprising a discontinuous film having an average height of 23 nm, which was formed on one surface, and a layer containing the silicone and silica fine particles, which was formed on the other surface, was prepared in the same manner as described in Example 1 except that SiO₂ particles having a particle diameter of 45 nm were not added and an aqueous solution containing 0.20% by weight of methyl cellulose and 0.05% by weight of N-β-(aminoethyl)-γ-aminopropylmetyldimethoxysilane was coated at a solid concentration of 20 mg/m² on the surface opposite to the surface coated with the aqueous coating liquid of Example 1. In this film, a coating layer having Rt of 86 nm and a dynamic friction coefficient of 0.70 to the metal was formed, the Young's modulus of the film in the machine direction was 420 kg/mm², the Young's modulus in the transverse direction was 750 kg/mm² and the static/dynamic friction coefficient of the film between the front and back surfaces was 0.7/0.5.

The same cobalt/nickel alloy this film as described in Example 1 was formed in a thickness of 150 nm on the discontinuous film-formed surface of the polyester film, and a magnetic tape was prepared in the same manner as in Example 1. The characteristics of the magnetic tape are shown in Table 1.

EXAMPLE 11

A polyethylene terephthalate film having a thickness of 10 μm, Rt of 23 nm and a refractive index $n_{ZD}$ of 1.489 in the thickness direction and comprising a discontinuous film having a height of 18 nm, which contained fine particles, had protrusions formed by the fine particles and was formed on one surface of the film and a layer of the silicone and silica fine particles, which was formed on the other surface, was prepared in the same manner as described in Example 10 except that a mixed aqueous solution containing 0.35% by weight of a water-soluble polyester copolymer (1/1 copolymer of an acid component comprising 40 mole % of terephthalate acid, 33 mole % of isophthalic acid, 20 mole % of adipic acid and 7 mole % of 5-sodium sulfoisophthalic acid and a glycol component comprising 40 mole % of diethylene glycol and 60 mole % of ethylene glycol), 0.25% by weight of methyl cellulose and 0.15% by weight of ultrafine silica having an average particle diameter of 20 nm was coated instead of the aqueous solution of the methyl cellulose/silane coupling agent used in Example 10. In this film, a coating layer having Rt of 86 nm and a dynamic friction coefficient of 0.70 to the metal was formed, the Young's modulus of the film in the machine direction was 420 kg/mm², the Young's modulus in the transverse direction was 750 kg/mm² and the static/dynamic friction coefficient of the film between the front and back surfaces was 0.5/0.4.

The same cobalt/nickel alloy thin film as described in Example 10 was formed on the polyester film on the surface on which the discontinuous film containing fine particles was formed, and a magnetic tape was prepared in the same manner as described in Example 10. The characteristics of the obtained magnetic tape are shown in Table 1.

EXAMPLE 12

A polyethylene terephthalate film having a thickness of 10 μm, Rt of 25 nm and a refractive index $n_{ZD}$ of 1.489 in the thickness direction, in which $2 \times 10^6/mm^2$ of knotty fine protrusion having an average diameter of 0.30 μm, a height of 20 nm and a height/diameter ratio of 0.066 were formed on one surface and the silicone and silica fine particles are contained in the other surface, was prepared in the same manner as described in Example 10 except that an aqueous emulsion comprising 0.20% by weight of a non-ionic surface active agent, 0.5% by weight of a polyacrylic acid ester emulsion (having an average particle diameter of 0.2 μm and a solid concentration of 40% by weight) and 0.035% by weight of N-β-(aminoethyl)-γ-aminopropylmethyldimethoxysilane as the silane coupling agent was coated instead of the aqueous solution of the methyl cellulose/silane coupling agent used in Example 10. In this film, a coating layer having Rt of 86 nm and a dynamic friction coefficient of 0.70 to the metal was formed, the Young's modulus of the film in the machine direction was 420 kg/mm², the Young's modulus in the transverse direction was 750 kg/mm² and the static/dynamic friction coefficient of the film between the front and back surfaces was 0.5/0.4.

The same cobalt/nickel alloy thin film as described in Example 10 was formed on the knotty protrusion-formed surface of the polyester film, and a magnetic tape was prepared in the same manner as described in Example 10. The characteristics of the obtained film and magnetic tape are shown in Table 1.

EXAMPLE 13

A polyethylene terephthalate film having a thickness of 10 μm, Rt of 25 nm and a refractive index $n_{ZD}$ of 1.489 in the thickness direction, in which a discontinuous film having an average height of 8 nm was formed on one surface, $2 \times 10^4/mm^2$ of fine protrusions having 14 nm were present and the silicone and silica fine particles were contained in the other surface, was prepared in the same manner as described in Example 1 except that the particle diameter of the SiO₂ particles used was changed to 110 nm and an aqueous solution containing 0.15% by weight of methyl cellulose and 0.05% by weight of N-β-(aminoethyl)-γ-aminopropylmethyldimethoxysilane as the silane coupling agent was coated at a solid concentration of 20 mg/m² on the surface opposite to the surface coated with the aqueous coating liquid in Example 1. In this film, a coating layer having Rt of 86 nm and a dynamic friction coefficient of 0.70 to the metal was formed, the Young's modulus of the film in the machine direction was 420 kg/mm$^2$, the Young's modulus in the transverse direction was 750 kg/mm$^2$ and the static/dynamic friction coefficient of the film between the front and back surfaces was 0.6/0.5.

The same cobalt/nickel alloy thin film as described in Example 1 was formed on the polyester film on the surface on which the discontinuous film having an average height of 8 nm was formed, and a magnetic tape was prepared in the same manner as in Example 1. The characteristics of the obtained film and magnetic tape are shown in Table 1.

EXAMPLE 14

Substantially unoriented, amorphous polyethylene terephthalate having a softening point of 258° C. and being substantially free of fine particles formed from the polymerization catalyst residue and the like, that is, internal particles, as the starting material for the layer A, and polyethylene terephthalate formed by incorporating 0.2% by weight of SiO$_2$ particles having an average particle diameter of 300 nm into the starting material for the layer A, as the starting material for the layer B, were melt-extruded at a thickness ratio of 9/1 on a rotary drum maintained at about 20° C., and the extrudate was drawn at a draw ratio of 3.0 in the machine direction at 90° C. Then, an aqueous coating liquid described below was coated at a solid concentration of 15 mg/m$^2$ on the surface of the layer A.

| | |
|---|---|
| Water-soluble polyester copolymer (1/1 copolymer of acid component comprising 40 mole % of terephthalic acid, 20 mole % of adipic acid, 33 mole % of isophthalic acid and 7 mole % of 5-sodium sulfoisophthalic acid and glycol component comprising 40 mole % of diethylene glycol and 60 mole % of ethylene glycol) | 0.35% by weight |
| Methyl cellulose | 0.25% by weight |
| Ultrafine silica having average particle diameter of 20 nm | 0.15% by weight |

The coated extrudate was passed through a stenter, dried at 115° C., pre-heated and drawn in the transverse direction. The draw ratio at the transverse drawing was 3.8. Then, the extrudate was drawn at a draw ratio of 1.17 in the transverse direction while being heat-treated a 200° C.

Thus, a polyethylene terephthalate film having a thickness of 10 μm, which comprised the layer A in which a discontinuous film having a height of 18 nm and containing fine particles forming protrusions was formed, Rt was 23 nm and the refractive index ($n_{ZD}$) in the thickness direction was 1.489 and the layer B having Rt of 110 nm on the outer surface thereof, was obtained. In this film, Rt of the surface of the layer B was 110 nm, the dynamic friction coefficient of the surface of the layer B to the metal was 0.55, the Young's modulus of the film in the machine direction was 420 kg/mm$^2$, the Young's modulus in the transverse direction was 750 kg/mm$^2$ and the static/dynamic friction coefficient of the film between the front and back surfaces was 0.5/0.4.

The same cobalt/nickel alloy thin film as described in Example 1 was formed on the surface of the layer A of the composite polyester film, and a magnetic tape was prepared in the same manner as in Example 1. The characteristics of the obtained magnetic tape are shown in Table 1.

EXAMPLE 15

A composite polyester film having a thickness of 10 μm, which comprised a layer A in which $2\times10^6$/mm$^2$ of knotty fine protrusions having an average diameter of 0.30 μm, a height of 20 nm and a height/diameter ratio of 0.066 were formed on one surface, Rt was 25 nm and the refractive index $n_{ZD}$ in the thickness direction was 1.489 and a layer B in which Rt of the outer surface was 110 nm, was prepared in the same manner as described in Example 14 except that an aqueous emulsion comprising 0.20% by weight of a non-ionic surface active agent, 0.5% by weight of a polyacrylic acid ester emulsion (having an average particle diameter of 0.2 μm and a solid concentration of 40% by weight) and 0.020% by weight of N-β-(aminoethyl)-γ-aminopropylmethyldimethoxysilane as the silane coupling agent was used instead of the aqueous coating liquid used in Example 14. In this film, Rt of the surface of the layer B was 110 nm, the dynamic friction coefficient of the surface of the layer B to the metal was 0.55, the Young's modulus of the film the machine direction was 420 kg/mm$^2$, the Young's modulus in the transverse direction was 750 kg/mm$^2$ and the static/dynamic friction coefficient of the film between the front and back surface was 0.4/0.3.

The same cobalt/nickel alloy thin film as described in Example 10 was formed on the knotty protrusion-formed surface of the layer A of the composite polyester film, and a magnetic tape was prepared in the same manner as described in Example 10. The characteristics of the obtained tape are shown in Table 1.

EXAMPLE 16

A composite polyester film having a thickness of 10 μm which comprised a layer A in which a discontinuous having a height of 18 nm and containing fine particles forming protrusions was formed on one surface, Rt was 23 nm and the refractive index $n_{ZD}$ in the thickness direction was 1.489 and a layer B in which Rt of the outer surface was 120 nm and a coating layer containing a silicone and silica fine particles was formed on the outer surface, was prepared in the same manner as described in Example 14 except that after the drawing at a draw ratio in the machine direction and the subsequent coating of the aqueous coating liquid, the same aqueous coating liquid as used in Example 1 was coated on the surface opposite to the aqueous coating liquid-coated surface, that is, the outer surface of the layer B, at a solid concentration of 20 mg/m$^2$. In this film, the dynamic friction coefficient of the surface of the layer B to the metal was 0.50, the Young's modulus of the film in the machine direction was 420 kg/mm$^2$, the Young's modulus in the transverse direction was 750 kg/mm$^2$ and the static/dynamic of the film between the front and back surfaces was 0.3/0.2.

The same cobalt/nickel thin film as used in Example 10 was formed on the surface of the layer A of the composite polyester film, and a magnetic tape was prepared in the same manner as described in Example 10. The characteristics of the obtained magnetic tape are shown in Table 1.

EXAMPLE 17

A composite polyester film having a thickness of 10 μm, which comprises a layer A in which $2\times10^6$/mm$^2$ of knotty fine protrusions having an average diameter of 0.30 μm, a height of 20 nm and a height/diameter ratio of 0.066 were formed on one surface, Rt was 25 nm and the refractive index $n_{ZD}$ in the thickness direction was 1.489 and a layer B in which Rt of the outer surface was 120 nm and a coating layer containing a silicone and silica fine particles was formed on the outer surface, was prepared in the same manner as described in Example 15 except that after the drawing at the draw ratio of 3.0 in the machine direction and the subsequent coating of the aqueous emulsion, the same aqueous coating liquid as used in Example 1 was further coated at a solid concentration of 20 mg/m² on the surface opposite to the surface coated with the aqueous emulsion, that is, the outer surface of the layer B. In this film, the dynamic friction coefficient of the surface of the layer B of the film was 0.50, the Young's modulus of the film in the machine direction was 420 kg/mm², the Young's modulus in the transverse direction was 750 kg/mm² and the static/dynamic friction coefficient of the film between the front and back surfaces was 0.3/0.2.

The same cobalt/nickel alloy thin film as described in Example 10 was formed on the surface of the layer A, and a magnetic tape was prepared in the same manner as described in Example 10. The characteristics of the obtained magnetic tape are shown in Table 1.

EXAMPLE 18

A composite polyester film having a thickness of 10 μm, which comprised a layer A in which $3.0 \times 10^5$/mm² of fine surface protrusion having an average height of 20 nm were formed, Rt was 30 nm and the refractive index $n_{ZD}$ in the thickness direction was 1.489 and a layer B in which Rt of the outer surface was 140 nm, was prepared in the same manner as described in Example 14 except that the starting polyethylene terephthalate used in Example 1 was used as the starting material for the layer A and starting polyethylene terephthalate formed by incorporating 0.2% by weight of CaCO₃ particles having a particle diameter of 400 nm into the starting material for the layer A was used as the starting material for the layer B, and the aqueous coating liquid was not coated. In this film, the dynamic friction coefficient of the surface of the layer B of the film to the metal was 0.45, the Young's modulus of the film in the machine direction was 420 kg/mm², the Young's modulus in the transverse direction was 750 kg/mm² and the static/dynamic friction coefficient of the film between the front and back surface was 0.3/0.15.

The same cobalt/nickel alloy thin film as described in Example 10 was formed on the surface of the layer A of the composite polyester film, and a magnetic tape was prepared in the same manner as in Example 10. The characteristics of the obtained magnetic tape are shown in Table 1.

EXAMPLE 19

A composite polyester film having a thickness of 10 μm, which comprises a layer A in which $3 \times 10^5$/mm² of fine surface protrusions having an average height of 20 nm were formed, Rt was 30 nm and the refractive index $n_{ZD}$ in the thickness direction was 1.489 and a layer B in which Rt of the outer surface was 140 nm and a coating layer containing a silicone and silica fine particles was formed on the outer surface, was prepared in the same manner as described in Example 18 except that after the drawing at the draw ratio of 3.0 in the machine direction, the same aqueous coating liquid as used in Example 1 was coated at a solid concentration of 20 mg/m² on the outer surface of the layer B. In this film, the dynamic friction coefficient of the coating layer on the surface of the layer B of the film to the metal was 0.45, the Young's modulus of the film in the machine direction was 420 kg/mm², the Young's modulus in the transverse direction was 750 kg/mm² and the static/dynamic friction coefficient of the film between the front and back surfaces was 0.3/0.15.

The same cobalt/nickel alloy thin film as described in Example 10 was formed on the surface of the layer A of the composite polyester film, and a magnetic tape was prepared in the same manner as in Example 10. The characteristics of the obtained magnetic tape are shown in Table 1.

EXAMPLE 20

A composite polyester film having a thickness of 10 μm, which comprised a layer A in which a discontinuous film having an average height of 8 nm was formed on one surface, $2 \times 10^4$/mm² of fine protrusion having a height of 14 nm were present, Rt was 25 nm and the refractive index $n_{ZD}$ in the thickness direction was 1.489 and a layer in which Rt of the outer surface was 120 nm and a coating layer containing a silicone and silica fine particles was formed on the outer surface, was prepared in the same manner as described in Example 14 except that the starting polyethylene terephthalate used in Example 13 was used as the starting polyethylene terephthalate for the layer A, the methyl cellulose/silane coupling agent aqueous solution used in Example 13 was coated on the surface of the layer instead of the aqueous coating liquid used in Example 14, and after the coating of the surface of the layer A, the same aqueous coating liquid as used in Example 1 was coated at a solid concentration of 20 mg/m² on the surface opposite to the coated surface, that is, the outer surface of the layer B. In this film, the dynamic friction coefficient of the surface of the layer B on the metal was 0.50, the Young's modulus of the film in the machine direction was 420 kg/mm², the Young's modulus in the transverse direction was 750 kg/mm² and the static/dynamic friction coefficient of the film between the front and back surfaces was 0.3/0.2.

The same cobalt/nickel alloy thin film as described in Example 10 was formed on the surface of the layer A of the composite polyester film, and a magnetic tape was prepared in the same manner as in Example 10. The characteristics of the obtained magnetic tape are shown in Table 1.

EXAMPLE 21

A starting material formed by incorporating 0.08% by weight of SiO₂ particles having a particle diameter of 200 nm into substantially unoriented, amorphous polyethylene terephthalate having a softening point of 258° C., which was substantially free of fine particles formed from the polymerization catalyst residue and the like, that is, internal particles, was melt-extruded on a rotary drum maintained at about 20° C., and the extrudate was drawn at a draw ratio of 30 in the machine direction at 90° C. Then, the drawn extrudate was passed through a stenter, pre-heated at 115° C. and drawn in the transverse direction at a draw ratio of 3.8. Then, the drawn extrudate was further drawn in the transverse direction at a draw ratio of 1.17 while being heat-treated at 200° C.

A polyethylene terephthalate film having a thickness of 10 μm was obtained. In this film, $3.0 \times 10^4/mm^2$ of fine surface protrusions having an average height of 90 nm were formed, Rt was 95 nm, the refractive index ($n_{ZD}$) in the thickness direction was 1.489, the dynamic friction coefficient to the metal was 0.70, the Young's modulus in the machine direction was 420 kg/mm², the Young's modulus in the transverse direction was 750 kg/mm² and the static/dynamic friction coefficient between the front and back surfaces was 0.9/0.7.

A cobalt/nickel alloy was vacuum-deposited in a thickness of 150 nm on the surface of this polyester film. Then, a protecting layer comprising an epoxy resin, a silicone and a silane coupling agent was coated in a thickness of 0.1 μm on the cobalt/nickel alloy thin film layer, and a backcoat layer comprising a carbon black-containing epoxy resin, a silicone and a silane coupling agent was formed in a thickness of 1 μm on the opposite surface B. Then, the film was cut in the machine direction at a predetermined width to obtain a magnetic tape.

The characteristics of the obtained magnetic tape are shown in Table 1.

COMPARATIVE EXAMPLE 1

A polyester film having a thickness of 10 μm was prepared in the same manner as described in Example 1 except that the draw ratio at the transverse drawing conducted simultaneously with the heat treatment at 220° C. was changed to 1.08. In this film, $3.0 \times 10^5/mm^2$ of fine surface protrusions having an average height of 21 nm were formed, Rt was 32 nm, $n_{ZD}$ was 1.493, a coating layer containing the silicone and silica fine particles and having Rt of 87 nm and a dynamic friction coefficient of 0.68 to the metal was formed on one surface, the Young's modulus of the film in the machine direction was 420 kg/mm², the Young's modulus in the transverse direction was 530 kg/mm² and the static/dynamic friction coefficient of the film between the front and back surfaces was 0.9/0.5. By using this film, a magnetic tape was prepared in the same manner as described in Example 1. The characteristics of the obtained magnetic tape are shown in Table 1.

COMPARATIVE EXAMPLE 2

A polyester film having a thickness of 10 μm was prepared in the same manner as described in Example 2 except that re-drawing was carried out at a draw ratio of 1.2 in the machine direction at a temperature of 110° C. before the heat treatment at 200° C. By using this film, a magnetic tape was prepared in the same manner as described in Example 2. In this polyester film, $3.0 \times 10^5/mm^2$ of fine surface protrusions having an average height of 20 nm were formed, Rt was 30 nm, $n_{ZD}$ was 1.493, a coating layer containing the silicone and silica fine particles and having Rt of 84 nm and a dynamic friction coefficient of 0.69 to the metal was formed on one surface, the Young's modulus of the film in the machine direction was 500 kg/mm², the Young's modulus in the transverse direction was 420 kg/mm² and the static/dynamic friction coefficient of the film between the front and back surfaces was 0.9/0.5. The characteristics of the obtained tape are shown in Table 1.

COMPARATIVE EXAMPLE 3

A polyester film having a thickness of 10 μm was prepared in the same manner as described in Example 3 except that the heat treatment temperature was elevated to 230° C. In this film, $2.4 \times 10^5/mm^2$ of fine surface protrusions having an average height of 19 nm were formed, Rt was 29 nm, $N_{ZD}$ was 1.503, a coating layer containing the silicone and silica fine particles and having Rt of 29 nm and a dynamic friction coefficient of 0.77 to the metal was formed on one surface, the Young's modulus of the film in the machine direction was 575 kg/mm², the Young's modulus in the transverse direction was 595 kg/mm² and the static/dynamic friction coefficient of the film between the front and back surfaces was 1.0/0.8. By using this film, a magnetic tape was prepared in the same manner as described in Example 1. The characteristics of the obtained magnetic tape are shown in Table 1.

COMPARATIVE EXAMPLE 4

A polyester film having a thickness of 10 μm was prepared in the same manner as described in Example 1 except that the heat treatment temperature was changed to 225° C. In this film, $2.4 \times 10^5/mm^2$ of fine surface projections having an average height of 19 nm were formed, Rt was 29 nm, $n_{ZD}$ was 1.498, a coating layer containing the silicone and silica fine particles and having Rt of 82 nm and a dynamic friction coefficient of 0.77 to the metal was formed on one surface, the Young's 410 kg/mm², the Young's modulus in the transverse direction was 740 kg/mm² and the static/dynamic friction coefficient of the film between the front and back surfaces was 1.0/0.8. By using this film, a magnetic tape was prepared in the same manner as described in Example 1. The characteristics of the obtained magnetic tape are shown in Table 1.

COMPARATIVE EXAMPLE 5

A polyester film having a thickness of 10 μm was prepared in the same manner as described in Example 1 except that the softening point of the starting polyethylene terephthalate was changed to 250° C. In this film, $3.0 \times 10^5/mm^2$ of fine surface protrusions having an average height of 20 nm were formed, Rt was 30 nm. $n_{ZD}$ was 1.475, a coating layer containing the silicone and silica fine particles and having Rt of 86 nm and a dynamic friction coefficient of 0.70 of the metal was formed on one surface, the Young's modulus of the film in the machine direction was 420 kg/mm², the Young's modulus in the transverse direction was 750 kg/mm² and the static/dynamic friction coefficient of the film between the front and back surfaces was 0.9/0.6. By using this film, a magnetic tape was prepared in the same manner as described in Example 1. The characteristics of the obtained magnetic tape are shown in Table 1.

COMPARATIVE EXAMPLE 6

A polyester film having thickness of 10 μm was prepared in the same manner as described in Example 1 except that a 1/1 blend of polyethylene terephthalate having a softening point of 258° C. and polyethylene terephthalate having a softening point of 250° C. was used as the starting material. In this film, $30 \times 10^5/mm^2$ of fine surface protrusions having an average height of 20 nm were formed, Rt was 30 nm, $n_{ZD}$ was 1.478, a coating layer containing the silicone and silica fine particles and having Rt of 87 nm and a dynamic friction coefficient of 0.70 to the metal was formed on one surface, the Young's modulus of the film in the machine direction was 420 kg/mm², the Young's modulus in the transverse direction was 750 kg/mm² and the static/dynamic friction coefficient of the film between the front and back surfaces was 0.9/0.6. By using this film, a magnetic tape was prepared in the same manner as described in Example 1. The characteristics of the obtained magnetic tape are shown in Table 1.

COMPARATIVE EXAMPLE 7

A polyester film having a thickness of 10 μm was prepared in the same manner as described in Example 1 except that the particle diameter of the $SiO_2$ particles used was changed to 330 nm. In this film, $3.0 \times 10^3/mm^2$ of fine surface protrusions having an average height of 100 nm were formed, Rt was 120 nm, $n_{ZD}$ was 1.489, a coating layer containing the silicone and silica fine particles and having Rt of 86 nm and a dynamic friction coefficient of 0.70 to the metal was formed on one surface, the Young's modulus of the film in the machine direction was 420 kg/mm², the Young's modulus in the transverse direction was 750 kg/mm² and the static/dynamic friction coefficient of the film between the front and back surfaces was 0.9/0.6. By using this film, a magnetic tape was prepared in the same manner as described in Example 1. The characteristics of the obtained film and magnetic tape are shown in Table 1.

COMPARATIVE EXAMPLE 8

A polyester film having a thickness of 10 μm was prepared in the same manner as described in Example 2 except that the draw ratio at the re-drawing conducted in the machine direction before the heat treatment at 200° C. was changed to 1.7 and the transverse drawing was not carried out during the heat treatment at 200° C. In this film, $3.5 \times 10^5/mm^2$ of fine surface protrusions having an average height of 25 nm were formed, Rt was 35 nm, $n_{ZD}$ was 1.488, a coating layer containing the silicone and silica fine particles and having Rt of 90 nm and a dynamic friction coefficient of 0.66 to the metal was formed on one surface, the Young's modulus of the film in the machine direction was 780 kg/mm², the Young's modulus in the transverse direction was 310 kg/mm² and the static/dynamic friction coefficient of the film between the front and back surfaces was 0.8/0.4. By using this film, a magnetic tape was prepared in the same manner as described in Example 1. The characteristics of the obtained magnetic tape are shown in Table 1.

COMPARATIVE EXAMPLE 9

A polyester film having a thickness of 10 μm was prepared in the same manner as described in Example 1 except that the draw ratio at the first drawing in the machine direction was changed to 2.5. In this film, $4.0 \times 10^5/mm^2$ of fine surface protrusions having an average height of 23 nm were formed, Rt was 35 nm, $n_{ZD}$ was 1.485, a coating layer containing the silicone and silica fine particles and having Rt of 85 nm and a dynamic friction coefficient of 0.68 to the metal was formed on one surface, the Young's modulus of the film in the machine direction was 325 kg/mm², the Young's modulus in the transverse direction was 790 kg/mm² and the static/dynamic friction coefficient of the film between the front and back surfaces was 018/0.4. By using this film, a magnetic tape was prepared in the same manner as described in Example 1. The characteristics of the obtained magnetic tape are shown in Table 1.

COMPARATIVE EXAMPLE 10

A polyethylene terephthalate film having a thickness of 10 μm was prepared in the same manner as described in Example 1 except that polyethylene terephthalate having a softening point of 262° C., which was obtained by using antimony oxide as the polymerization catalyst instead of germanium oxide used in Example 1, was used as the starting material. In this film, $3.0 \times 10^5/mm^2$ of fine surface protrusions having an average height of 20 nm were formed, Rt was 30 nm, the refractive index ($n_{ZD}$) in the thickness direction was 1.493, a coating layer containing the silicone and silica fine particles and having Rt of 86 nm and a dynamic friction coefficient of 0.70 to the metal was formed on one surface, the Young's modulus of the film in the machine direction was 420 kg/mm², the Young's modulus in the transverse direction was 750 kg/mm² and the static/dynamic friction coefficient of the film between the front and back surfaces was 0.9/0.6. By using this film, a magnetic tape was prepared in the same manner as described in Example 1. The characteristics of the obtained magnetic tape are shown in Table 1.

TABLE 1

| | Tape characteristics | | | | | |
|---|---|---|---|---|---|---|
| | Initial characteristics | | Characteristics after 100 travels | | | |
| | S/N ratio (dB) | Drop-out (frequency per min) | S/N ratio (db) | Drop-out (frequency per min) | Formation of scratch on magnetic surface of tape *1 | Appearance of head after 100 travels of tape *2 |
| Example | | | | | | |
| 1 | +5.3 | 20 | +5.3 | 20 | A | A |
| 2 | +5.2 | 20 | +5.2 | 20 | A | A |
| 3 | +5.2 | 20 | +5.1 | 20 | A | A |
| 4 | +4.8 | 20 | +4.6 | 21 | A-B | A |
| 5 | +3.5 | 25 | +3.5 | 25 | A | A |
| 6 | +5.3 | 20 | +5.3 | 20 | A | A |
| 7 | +5.2 | 20 | +5.2 | 20 | A-B | A |
| 8 | +4.0 | 21 | +4.0 | 21 | A | A |
| 9 | +5.0 | 20 | +5.0 | 20 | A | A |
| 10 | +5.3 | 20 | +5.3 | 20 | A | A |
| 11 | +5.6 | 15 | +5.6 | 15 | A | A |
| 12 | +5.5 | 20 | +5.5 | 20 | A | A |
| 13 | +5.5 | 20 | +5.5 | 20 | A | A |
| 14 | +5.5 | 15 | +5.6 | 15 | A | A |
| 15 | +5.4 | 20 | +5.5 | 20 | A | A |
| 16 | +5.5 | 15 | +5.6 | 15 | A | A |
| 17 | +5.4 | 20 | +5.5 | 20 | A | A |
| 18 | +5.2 | 20 | +5.2 | 20 | A | A |
| 19 | +5.2 | 20 | +5.2 | 20 | A | A |
| 20 | +5.4 | 20 | +5.4 | 20 | A | A |
| 21 | +3.5 | 30 | +3.5 | 30 | A | A |
| Comparative Example | | | | | | |
| 1 | +2.0 | 40 | +1.8 | 22 | A | A |
| 2 | +1.9 | 40 | +1.7 | 24 | A | A |
| 3 | +5.2 | 20 | −5.0 | 120 | D | C |
| 4 | +5.2 | 20 | −4.5 | 100 | C | C |
| 5 | −1.5 | 40 | −1.5 | 40 | A | A |
| 6 | −1.0 | 30 | −1.0 | 30 | A | A |
| 7 | −2.5 | 100 | −2.5 | 100 | A | A |
| 8 | +4.8 | 20 | After 50 travels, tape edge come to resemble seaweed and good picture could not be reproduced. | | | |
| 9 | +4.8 | 20 | After 20 travels, tape was elongated in machine direction and good picture could not be reproduced. | | | |

TABLE 1-continued

| | Tape characteristics | | | | | |
|---|---|---|---|---|---|---|
| | Initial characteristics | | Characteristics after 100 travels | | | |
| | S/N ratio (dB) | Drop-out (frequency per min) | S/N ratio (db) | Drop-out (frequency per min) | Formation of scratch on magnetic surface of tape *1 | Appearance of head after 100 travels of tape *2 |
| 10 | +4.0 | 60 | +0.5 | 110 | C | C |

Note
*1: formation of scratches on the magnetic surface of the tape
A: no scratch was formed
B: formation of scratches was observed only to a negligible extend
C: formation of scratches was observed
D: formation of scratches was conspicuous
*2: appearance of the head after 100 travels of the tape
A: not damaged
C: damaged

INDUSTRIAL APPLICABILITY

The polyester film and composite polyester film of the present invention are valuable as base films of magnetic recording media. When a magnetic recording medium is prepared by forming a ferromagnetic metal thin film on the surface of the film by vacuum deposition, the processability is good and the formed magnetic recording medium shows excellent effects. For example, the drop-out is reduced, uniform contact is attained with a magnetic head, the scratch resistance is good, the magnetic head is damaged only to a negligible extent, and electric-magnetic conversion characteristics are good.

More specifically, the polyester film of the present invention is characterized in that the Young's modulus in either the machine direction or the transverse direction is at least 350 kg/mm², the product of these elastic moduli is at least 250,000 kg²/mm⁴, the refractive index in the thickness direction is in the range of from 1.480 to 1.492 and Rt is up to 100 nm. By dint of these characteristic features, a ferromagnetic metal thin film formed on the surface of this film has a pliability, and the shook to mechanic contact is reduced and formation of a scratch on the metal thin film by mechanic contact can be prevented. Furthermore, the magnetic head is prevented from being damaged. In connection with the entire mechanical characteristics, the Young's modulus is at least 350 kg/mm². Accordingly, elongation or bending does not occur in a video tape recorder. Moreover, since the product of the Young's modulus in the machine direction and the Young's modulus in the transverse direction is at least 250,000 kg²/mm⁴, uniform contact is attained between the tape and magnetic head in the tape recorder.

If a coating layer comprising a polar polymer, an organic lubricant and inorganic fine particles is formed on one surface of the polyester film of the present invention, the slipperiness is improved and wrinkles are not formed at the step of winding the film, and a good handling property is manifested at the processing step of forming a ferromagnetic metal thin film on the film.

If a laminate structure of layers A and B composed of a polyester is given to the polyester film and fine particles are incorporated in the layer B to adjust Rt of the outer surface of the layer B to 30 to 140 nm, the slipperiness is similarly improved and wrinkles are not formed at the step of winding the film, and a good handling property is manifested at the processing step of forming a ferromagnetic metal thin film on the film.

If fine particles are incorporated in the base layer of the coated polyester film $A_2$ or if fine particles are incorporated in the layer A of the composite polyester film a8, fine protrusions are formed on the surface of the base layer or on the outer surface of the layer A by the fine particles, and after formation of the metal thin film, an effect of preventing clogging in the head can be attained.

If a discontinuous film having a height of up to 30 nm and composed mainly of a water-soluble polymer containing inorganic fine particles is formed on one surface (the surface on which a ferromagnetic metal thin film is to be formed), the touch with the head or the running properly on the head is improved in a tape prepared by forming a ferromagnetic metal thin film on the film by the presence of this discontinuous film.

Furthermore, if knotty protrusions having a height of up to 30 μm are formed on one surface (the surface on which a ferromagnetic metal thin film is to be formed) of the polyester film of the present invention, when a magnetic recording medium is prepared by forming a metal thin film on the knotty protrusion formed surface, slipperiness of the recording medium to a magnetic head is good event under high-temperature and high-humidity conditions, and clogging of the head does not occur. Moreover, since the knotty protrusions have a smooth configuration, the metal thin film is not shaved off by the magnetic head.

We claim:

1. A polyester film for forming thereon a ferromagnetic metal thin film for a magnetic recording medium, which is composed of a polyester prepared by using a germanium compound as the polymerization catalyst, wherein the Young's modulus $E_{MD}$ in the machine direction thereof and the Young's modulus $E_{TD}$ in the transverse direction thereof satisfy the requirements of $E_{MD} \geq 350$ kg/mm², $E_{TD} \geq 350$ kg/mm² and $E_{MD} \times E_{TD} \geq 250,000$ kg²/mm⁴, the refractive index $n_{ZD}$ in the thickness direction thereof satisfies the requirement of $1.480 \leq n_{ZD} \leq 1.492$, and the maximum roughness Rt of one surface of the film is not larger than 100 nm and the maximum roughness Rt of the other surface of the film is in the range of from 30 to 150 nm.

2. A polyester film as set forth in claim 1 wherein the polyester film is a base layer and a coating layer comprising a polar polymer, an organic lubricant and inorganic fine particles are formed on the base layer so that the exposed surface of the base layer has a maximum roughness Rt of not larger than 100 nm and the exposed surface of the coating layer has a maximum roughness Rt of from 30 to 150 nm; the dynamic friction coefficient of the exposed surface of the coating layer to metal (SUS) being not larger than 2.0 and the static friction coefficient and dynamic friction coefficient of the exposed surface of the coating layer to the uncoated surface of the film being not larger than 3.0 and not larger than 2.0, respectively.

3. A polyester film as set forth in claim 2, wherein a discontinuous film having a height of up to 30 nm and composed of a water-soluble polymer is formed on the exposed surface of the base layer on which the coating layer is not formed.

4. A polyester film as set forth in claim 3, wherein the discontinuous film contains inorganic fine particles.

5. A polyester film as set forth in claim 2, wherein knotty protrusions having a height of up to 30 nm are formed on the exposed surface of the base layer on which the coating layer is not formed.

6. A polyester film as set forth in claim 2, wherein fine particles are incorporated in the base layer and the maximum roughness Rt of the exposed surface of the base layer on which the coating layer is not formed is in the range of from 5 to 100 nm.

7. A polyester film as set forth in claim 6, wherein the particle diameter of the fine particles in the base layer is in the range of 10 to 300 nm, the content of the fine particles is 0.003 to 1.0% by weight, and $10^3$ to $10^7/mm^2$ of fine surface protrusions having a height of 5 to 100 nm are formed on the exposed surface of the base layer on which the coating layer is not formed by the fine particles.

8. A polyester film as set forth in claim 6, wherein a discontinuous film having a height of up to 30 nm and composed of a water-soluble polymer is formed on the surface of the base layer on which the coating layer is not formed.

9. A polyester film for forming thereon a ferromagnetic metal thin film for a magnetic recording medium, which comprises a laminate of layers A and B of polyester formed by using a germanium compound as the polymerization catalyst, wherein Young's modulus $E_{MD}$ in the machine direction thereof and the Young's modulus $E_{TD}$ in the transverse direction thereof satisfy the requirements of $E_{MD} \geq 350$ kg/mm², $E_{TD} \geq 350$ kg/mm² and $E_{MD} \times E_{TD} \geq 250,000$ kg²/mm⁴, the refractive index $n_{ZD}$ in the thickness direction satisfies the requirement of $1.480 \leq n_{ZD} \leq 1.492$, fine particles are incorporated in the layer B, the maximum roughness of the exposed surface of the layer A which is not in contact with the layer B satisfies the requirement of $Rt \leq 100$ nm, and the maximum roughness Rt of the exposed surface of the layer B which is not in contact with the layer A is in the range of from 30 to 150 nm.

10. A polyester film as set forth in claim 9, wherein a discontinuous film having a height of up to 30 nm and composed of a water-soluble polymer containing inorganic fine particles is formed on the exposed surface of the layer A which is not in contact with the layer B.

11. A polyester film as set forth in claim 9, wherein knotty protrusions having a height of up to 30 nm are formed on the exposed surface of the layer A which is not in contact with the layer B.

12. A polyester film as set forth in claim 9, wherein fine particles are incorporated in the layer A of the polyester A and the maximum roughness Rt of the exposed surface of the layer A which is not in contact with the layer B is in the range of 5 to 100 nm.

13. A polyester film as set forth in claim 12, wherein the particle diameter of the fine particles in the layer A of the polyester film is 10 to 300 nm, the content of the fine particles is 0.003 to 1.0% by weight, and $10^3$ to $10^7/mm^2$ of fine surface protrusions having a height of 5 to 100 nm are formed on the exposed surface of the layer A which is not in contact with the layer B of the fine particles.

14. A polyester film as set forth in claim 10, wherein a coating layer comprising a polar polymer, an organic lubricant and inorganic fine particles is formed on the exposed surface of the layer B which is not in contact with the layer A, the exposed surface of the coating layer having a maximum roughness Rt of from 30 to 150 nm, and the dynamic friction coefficient of the exposed surface of the coating layer to metal (SUS) being not larger than 2.0 and the static friction coefficient and dynamic friction coefficient of the exposed surface of the coating layer to the uncoated surface of the film being not larger than 3.0 and not larger than 2.0, respectively.

15. A polyester film as set forth in claim 11, wherein a coating layer comprising a polar polymer, an organic lubricant and inorganic fine particles is formed on the exposed surface of the layer B which is not in contact with the layer A, the exposed surface of the coating layer having a maximum roughness Rt of from 30 to 150 nm, and the dynamic friction coefficient of the exposed surface of the coating layer to metal (SUS) being not larger than 2.0 and the static function coefficient and dynamic friction coefficient of the exposed surface of the coating layer to the uncoated surface of the film being not larger than 3.0 and not larger than 2.0, respectively.

16. A polyester film as set forth in claim 12, wherein a coating layer comprising a polar polymer, an organic lubricant and inorganic fine particles is formed on the exposed surface of the layer B which is not in contact with the layer A, the exposed surface of the coating layer having a maximum roughness Rt of from 30 to 150 nm, and the dynamic friction coefficient of the exposed surface of the coating layer to metal (SUS) being not larger than 2.0 and the static friction coefficients and dynamic friction coefficient of the exposed surface of the coating layer to the uncoated surface of the film being not larger than 3.0 and not larger than 2.0, respectively.

17. A polyester film as set forth in claim 16, wherein a discontinuous film having a height of up to 30 nm and composed of a water-soluble polymer is formed on the exposed surface of the layer A which is not in contact with the layer B.

18. A magnetic recording medium having a ferromagnetic metal thin film formed thereon, which comprises a polyester film and a thin film comprising at least one ferromagnetic metal selected from the group consisting of iron, cobalt, nickel and alloys thereof, which is formed on one surface of the polyester film, wherein the polyester film is composed of a polyester prepared by using a germanium compound as the polymerization catalyst, in which the Young's modulus $E_{TD}$ in the transverse direction thereof satisfy the requirements of $E_{MD} \geq 350$ kg/mm², $E_{TD} \geq 350$ kg/mm² and $E_{MD} \times E_{TD} \geq 250,000$ kg²/mm⁴, the refractive index $n_{ZD}$ in the thickness direction satisfies the requirement of $1.480 \leq n_{ZD} \leq 1.492$, and the surface of the polyester film on which the thin ferromagnetic metal film is formed has a maximum roughness Rt of not larger than 100 nm and the surface of the polyester film on which the thin ferromagnetic metal film is not formed has a maximum roughness Rt of from 30 to 150 nm.

19. A magnetic recording medium having a ferromagnetic metal thin film formed thereon, which comprises a polyester film and a thin film comprising at least one ferromagnetic metal selected from the group consisting of iron, cobalt, nickel and alloys thereof, which is formed on one surface of the polyester film, wherein the polyester film comprises a laminate of layers A and B of a polyester formed by using a germanium compound as the polymerization catalyst, wherein Young's modulus $E_{MD}$ in the machine direction thereof and the Young's modulus $E_{TD}$ in the transverse direction thereof satisfy the requirements of $E_{MD} \geq 350$ kg/mm², $E_{TD} \geq 350$ kg/mm² and $E_{MD} \times E_{TD} \geq 250,000$ kg²/mm⁴, the refractive index $n_{ZD}$ in the thickness direction satisfies the requirement of $1.480 \leq n_{ZD} \leq 1.492$, fine particles are incorporated in the layer B, and the surface of the layer A on which the thin ferromagnetic metal thin film is formed has a maximum roughness Rt of not larger than 100 nm and the exposed surface of the layer B which is not in contact with the layer A has a maximum roughness Rt of from 30 to 150 nm; the dynamic friction coefficient of the exposed surface of the coating layer to metal (SUS) being not larger than 2.0 and the static friction coefficient and dynamic friction coefficient of the exposed surface of the coating layer to the uncoated surface of the film being not larger than 3.0 and not larger than 2.0, respectively.

* * * * *

UNITED STATES PATENT AND TRADEMARK OFFICE
CERTIFICATE OF CORRECTION

PATENT NO. : 5,047,278

DATED : September 10, 1991

INVENTOR(S) : Masaaki Ono et al

It is certified that error appears in the above-identified patent and that said Letters Patent is hereby corrected as shown below:

On the title page: in the Abstract,
line 8, please change "$\geq$", both occurrences, to --$\leq$--;
line 10, please change "$\overline{\overline{\pi}\geq}$" to --$\leq$--;
line 14, please change "$\overline{E}_{tD}$" to --$E_{TD}$--; and
line 17, please change "$\geq$" to --$\leq$--.

Column 1, line 57, please change "manly" to --mainly--.

Column 4, line 25, please change "$\geq$", both occurrences to --$\leq$--.

Column 11, line 30, after "$BaSO_4$" insert --$Al_2O_3$,--; and
line 62, after "per" insert --100--.

Column 28, line 26, after "Young's", first occurrence, insert --modulus of the film in the machine direction was--.

Column 33, line 49, please change "A" to --film--.

Column 34, line 13, please change "function" to --friction--.

UNITED STATES PATENT AND TRADEMARK OFFICE
CERTIFICATE OF CORRECTION

PATENT NO. : 5,047,278

DATED : September 10, 1991

INVENTOR(S) : Masaaki Ono, et al

It is certified that error appears in the above-identified patent and that said Letters Patent is hereby corrected as shown below:

Column 34, line 26, change "coefficients" to --coefficient--.

Signed and Sealed this

Twenty-seventh Day of April, 1993

Attest:

MICHAEL K. KIRK

Attesting Officer

Acting Commissioner of Patents and Trademarks